US009432692B2

(12) United States Patent
Lin et al.

(10) Patent No.: US 9,432,692 B2
(45) Date of Patent: Aug. 30, 2016

(54) METHOD, APPARATUS AND DEVICE FOR OBTAINING MOTION INFORMATION OF VIDEO IMAGES AND TEMPLATE CONSTRUCTION METHOD

(75) Inventors: Sixin Lin, Shenzhen (CN); Mingyuan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 750 days.

(21) Appl. No.: 13/335,344

(22) Filed: Dec. 22, 2011

(65) Prior Publication Data
US 2012/0106645 A1    May 3, 2012

Related U.S. Application Data

(63) Continuation of application No. PCT/CN2010/073477, filed on Jun. 2, 2010.

(30) Foreign Application Priority Data

Jun. 26, 2009 (CN) .......................... 2009 1 0148520
Apr. 9, 2010 (CN) .......................... 2010 1 0147607

(51) Int. Cl.
H04N 19/51 (2014.01)
H04N 19/56 (2014.01)
H04N 19/577 (2014.01)

(52) U.S. Cl.
CPC ............ *H04N 19/577* (2014.11); *H04N 19/51* (2014.11); *H04N 19/56* (2014.11)

(58) Field of Classification Search
CPC ..... H04N 19/51; H04N 19/56; H04N 19/577
USPC ........ 348/699, 416.1, 413.1, 402.1; 382/233, 382/236, 238, 239; 375/240.01–240.28
See application file for complete search history.

(56) References Cited

U.S. PATENT DOCUMENTS

2006/0256866 A1* 11/2006 Ziauddin et al. ........ 375/240.15
2007/0217511 A1*  9/2007 Li .......................... H04N 19/56
                                                    375/240.16

(Continued)

FOREIGN PATENT DOCUMENTS

CN          1925614 A      3/2007
CN        101227614 A      7/2008

(Continued)

OTHER PUBLICATIONS

Office Action issued in corresponding Chinese Patent Application No. 201010147607.4, mailed Apr. 28, 2012.

(Continued)

*Primary Examiner* — Behrooz Senfi
(74) *Attorney, Agent, or Firm* — Brinks Gilson & Lione

(57) ABSTRACT

A method is provided. The method includes: determining one or more first candidate reference blocks that correspond to a current block in a first reference frame according to known motion information related to the current block; determining one or more second candidate reference blocks in a second reference frame; calculating a sum of differences between pixels of each of the one or more first candidate reference blocks and pixels of a second candidate reference block that is of the one or more second candidate reference blocks and that corresponds to the first candidate reference block; selecting a first candidate reference block and a second candidate reference block with a minimum sum of differences as a first reference block and a second reference block of the current block; and obtaining motion information of the current block according to motion information determined by the first reference block and the second reference block.

7 Claims, 13 Drawing Sheets

(56) References Cited

U.S. PATENT DOCUMENTS

| | | | | |
|---|---|---|---|---|
| 2008/0159401 | A1* | 7/2008 | Lee | H04N 7/50 375/240.16 |
| 2009/0034854 | A1* | 2/2009 | Lee et al. | 382/236 |
| 2009/0147855 | A1 | 6/2009 | Song et al. | |
| 2009/0225847 | A1* | 9/2009 | Min | H04N 19/105 375/240.16 |
| 2011/0158320 | A1* | 6/2011 | Zheng | H04N 19/50 375/240.16 |
| 2011/0261882 | A1* | 10/2011 | Zheng | H04N 19/105 375/240.13 |

FOREIGN PATENT DOCUMENTS

| | | |
|---|---|---|
| CN | 101267556 A | 9/2008 |
| EP | 1521477 A1 | 4/2005 |
| KR | 1020090012926 A | 2/2009 |
| WO | WO 2009126260 A1 | 10/2009 |

OTHER PUBLICATIONS

Patent Examination Report issued in corresponding Australian Patent Application No. 2010265451; issued May 23, 2013.
Office Action issued in corresponding Korean Patent Application No. 10-2011-7029854, mailed Mar. 20, 2013.
Extended European Search Report issued in corresponding European Patent Application No. 10791425.1, mailed Mar. 1, 2013.
Kamp et al., "Fast Decoder Side Motion Vector Derivation for Inter Frame Video Coding" Picture Coding Symposium, Chicago, May 5-8, 2009. XP030081800.
Yang et al., "Description of Video Coding Technology Proposal by Huawei Technologies & Hisilicon Technologies" JCT-VC Meeting (Joint Collaborative Team on Video Coding of ISO/IEC JTC1/SC29/WG11 and ITU-TSG.16) Apr. 17, 2010. XPO55054060.
Tourapis et al., "Direct Mode Coding for Bipredictive Slices in the H.264 Standard" IEEE Transactions on Circuits and Systems for Video Technology, vol. 15, No. 1, Jan. 2005.
Kimata et al., "Spatial Temporal Adaptive Direct Prediction for Bi-Directional Prediction Coding on H.264" Picture Coding Symposium, Saint Malo, Apr. 23, 2003. XP030080000.
Written Opinion of the International Searching Authority issued in corresponding PCT Patent Application No. PCT/CN2010/073477, mailed Sep. 9, 2010.
International Search Report issued in corresponding PCT Patent Application No. PCT/CN2010/073477, mailed Sep. 9, 2010.
Kamp et al., "Decoder Side Motion Vector Derivation with Multiple Reference Pictures", and "Coding with 1 Reference Frame" data tables, Telecommunications Standardization Sector, Q.6/CG16 (VCEG). 34$^{th}$ Meeting: Antalya, Turkey, Jan. 12-13, 2008. VCEG-AH15.
Kamp et al., "Decoder-side MV Derivation with Multiple Reference Pictures" Slide Show, Telecommunications Standardization Sector, Q.6/SG16 (VCEG). 34$^{th}$ Meeting: Antalya, Turkey, Jan. 12-13, 2008.
Kamp et al., "Decoder Side Motion Vector Derivation with Multiple Reference Pictures", and "Coding with 1 Reference Frame" Data Tables, Telecommunications Standardization Sector, Q.6/SG16 (VCEG). 34$^{th}$ Meeting: Antalya, Turkey, Jan. 12-13, 2008. VCEG-AH15r1.
Kamp et al., Fast Decoder Side Motion Vector Derivation and Data Tables, Telecommunications Standardization Sector, Q.6/SG16 (VCEG).36$^{th}$ Meeting: San Diego, CA, Oct. 8-10, 2008. VCEG-AJ18.
Kamp et al., Fast Decoder Side Motion Vector Derivation Slide Show, Telecommunications Standardization Sector, Q.6/SG16 (VCEG). 36$^{th}$ Meeting: San Diego, CA, Oct. 8-10, 2008.
Murakami et al., Advanced B Skip Mode with Decoder-side Motion Estimation Telecommunications Standardization Sector, Q.6/SG16 (VCEG). 7$^{th}$ Meeting: Yokohama, Japan, Apr. 15-18, 2009. VCEG-AK12.
Murakami et al., Advanced B Skip Mode with Decoder-side Motion Estimation Slide Show, Telecommunications Standardization Sector, Q.6/SG16 (VCEG). 7$^{th}$ Meeting: Yokohama, Japan, Apr. 15-18, 2009.
Huawei Technologies, "Timing and Processing Model for Timed Graphics" Agenda Item 6. TSG-SA4#56 Meeting, Sophia Antipolis, France, Nov. 9-13, 2009. Tdoc S4 (09)0879.
Huawei Technologies, "Permanent Document on Use Cases and Requirements for Timed Graphics" v0.1. TSG-SA4#53 Meeting, San Diego, CA, Apr. 13-17, 2009. Tdoc S4 (09)0324.
LTE, "3$^{rd}$ Generation Partnership Project: Technical Specification Group Services and System Aspects; Timed Graphics" (Release 9) 3GPP TS 26.430, V9.0.0. Mar. 2010.
GSM, "3$^{rd}$ Generation Partnership Project: Technical Specification Group Services and System Aspects; Dynamic and Interactive Multimedia Scenes" (Release 7) 3GPP TS 26.142, V7.2.0 Dec. 2007.
LTE, "3$^{rd}$ Generation Partnership Project: Technical Specification Group Services and System Aspects; Timed Graphics" (Release 9) 3GPP TS 26.430, V1.1.0, 2010.
Presentation of Specification to TSG, "TS26.430, Version 1.1.0" TSG SA Meeting #47. 3GPP TSG-SA4, #57, St. Julians, Malta, Jan. 25-29, 2010. S4-100123.
Rey et al., "RTP Payload Format for 3$^{rd}$ Generation Partnership Project (3GPP) Timed Text" Network Working Group, Feb. 2006. rfc4396.
Wenger et al., "RTP Payload Format for H.264 Video" Network Working Group, Feb. 2005. rfc3984.
Schulzrinne et al., "RTP: A Transport Protocol for Real-Time Applications" Network Working Group, Jul. 2003. rfc3550.
Chinese Patent No. 101931803, issued on Jan. 9, 2013, granted in corresponding Chinese Patent Application No. 201010147607.4.

* cited by examiner

METHOD, APPARATUS AND DEVICE FOR OBTAINING MOTION INFORMATION OF VIDEO IMAGES AND TEMPLATE CONSTRUCTION METHOD

CROSS-REFERENCE TO RELATED APPLICATIONS

This application is a continuation of International Application No. PCT/CN2010/073477, filed on Jun. 2, 2010, which claims priority to Chinese Patent Application No. 200910148520.6, filed on Jun. 26, 2009 and Chinese Patent Application No. 201010147607.4, filed on Apr. 9, 2010, all of which are hereby incorporated by reference in their entireties.

FIELD OF THE APPLICATION

The present application relates to video technologies, and in particular, to a method, an apparatus and a device for obtaining motion information of video images in a video image encoding and decoding process, and a template construction method applied in a video image encoding and decoding process.

BACKGROUND OF THE APPLICATION

With the continuous development of video encoding technologies, inter-frame motion search and compensation technologies can effectively eliminate the time redundancy of video contents, and the encoding efficiency is greatly improved. Motion information is obtained through motion estimation and then transferred to a decoding end, and the decoding end predicts and reconstructs a video image by a motion compensation method. However, as after motion compensation, the proportion of the prediction residual in a code stream significantly decreases and the proportion of motion vector information in the code stream continuously increases, how to effectively compress motion information becomes crucial to further improve the video compression efficiency.

A method for obtaining motion information by reducing the proportion of the motion information in a code stream in a video image encoding and decoding process is provided in the prior art.

Motion vectors are obtained through template matching. Specifically, taking a current block being a macro block in a B frame as an example, as shown in FIG. 1, first, a template TM is constructed around the current block by using reconstruction values, and then motion vectors MV0 and MV1 serving as motion vectors of the current block are obtained by using a template of the same shape as the template TM to perform matching search in a forward reference frame (Ref List0) and a backward reference frame (Ref List1) of the block, and meanwhile, a predicted value of the current block is obtained, and is used for performing prediction residual encoding.

In the implementation of the present application, the inventors find that the prior art at least has the following problem.

A large prediction error is introduced when the motion information is obtained, resulting in a low encoding efficiency of video images.

SUMMARY OF THE APPLICATION

Embodiments provide a method, an apparatus and a device for obtaining motion information of video images, which can improve the encoding and decoding efficiency of video images by improving the process of obtaining motion information in video images.

The embodiments adopt the following technical solutions.

A method for obtaining motion information of video images includes:

determining one or more first candidate reference blocks that correspond to a current block in a first reference frame according to known motion information related to the current block;

determining one or more second candidate reference blocks in a second reference frame, wherein each of the one or more second candidate reference blocks corresponds respectively to one of the one or more first candidate reference blocks;

calculating a sum of differences between pixels of each of the one or more first candidate reference blocks and pixels of a second candidate reference block that is of the one or more second candidate reference blocks and that corresponds to the first candidate reference block;

selecting a first candidate reference block and a second candidate reference block with a minimum sum of differences as a first reference block and a second reference block of the current block; and obtaining motion information of the current block according to motion information determined by the first reference block and the second reference block.

An apparatus for obtaining motion information of video images includes:

a first determining unit configured to determine one or more first candidate reference blocks that correspond to a current block in a first reference frame according to known motion information related to the current block;

a second determining unit configured to determine one or more second candidate reference blocks in a second reference frame, wherein each of the one or more second candidate reference blocks corresponds respectively to one of the one or more first candidate reference blocks;

a calculating unit configured to calculate a sum of differences between pixels of each of the one or more first candidate reference blocks and pixels of a second candidate reference block that is of the one or more second candidate reference blocks and that corresponds to the first candidate reference block; and a selecting unit configured to select a first candidate reference block and a second candidate reference block with a minimum sum of differences as a first reference block and a second reference block of the current block; and obtain motion information of the current block according to motion information determined by the first reference block and the second reference block.

A method for obtaining motion information of video images includes:

obtaining first motion information related to a current block through template matching in a first reference frame, and determining a first reference block according to the first motion information;

obtaining second motion information related to the first reference block through template matching in a second reference frame;

determining a second reference block according to the second motion information; and determining motion information of the current block according to the first motion information and the second motion information.

An apparatus for obtaining motion information of video images includes:

a first matching unit, configured to obtain first motion information related to a current block through template matching in a first reference frame, and determine a first reference block according to the first motion information;

a second matching unit, configured to obtain second motion information related to the first reference block through template matching in a second reference frame, and determine a second reference block according to the second motion information; and a calculating unit, configured to calculate motion information of the current block according to the first motion information and the second motion information.

An embodiment further provides a template construction method in a video encoding and decoding process, which includes:

when reconstruction values of a part of neighboring blocks of a current block are unknown, obtaining predicted values the part of the neighboring blocks in a corresponding reference frame according to parsed motion information corresponding to the part of the neighboring blocks with unknown reconstruction values, and constructing a template by using the predicted values of the part of neighboring blocks of the current block and known reconstruction values of another part of neighboring blocks of the current block.

The method and apparatus for obtaining motion information of video images provided in the embodiments can improve the encoding and decoding efficiency of video images by changing the method for determining reference blocks to improve the process of obtaining motion information of video images. The template construction method provided in the embodiment can use predicted values corresponding to a part of neighboring blocks of the current block to replace unknown reconstruction values of the part of the neighboring blocks of the current block when the current block is a partition block, so as to complete template construction for the current block.

BRIEF DESCRIPTION OF THE DRAWINGS

To illustrate the technical solutions according to the embodiments or in the prior art more clearly, the accompanying drawings required for describing the embodiments or the prior art are introduced below briefly. Apparently, the accompanying drawings in the following descriptions merely show some of the embodiments, and persons of ordinary skill in the art can obtain other drawings according to the accompanying drawings without creative efforts.

DETAILED DESCRIPTION OF THE EMBODIMENTS

The technical solutions according to the embodiments will be clearly and completely described below with reference to the accompanying drawings. It is obvious that the embodiments to be described are only a part rather than all of the embodiments. All other embodiments obtained by persons of ordinary skill in the art based on the embodiments without creative efforts shall fall within the protection scope of the claims.

Embodiment 1

Figure 1:
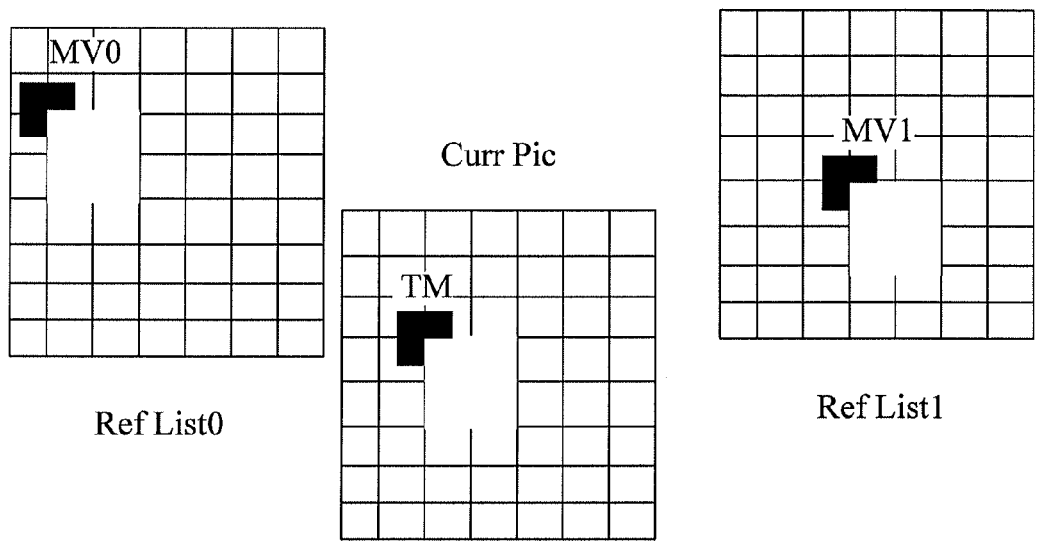
FIG. 1 is a schematic diagram of a method for obtaining motion vectors through template matching in the prior art.
Figure 2:
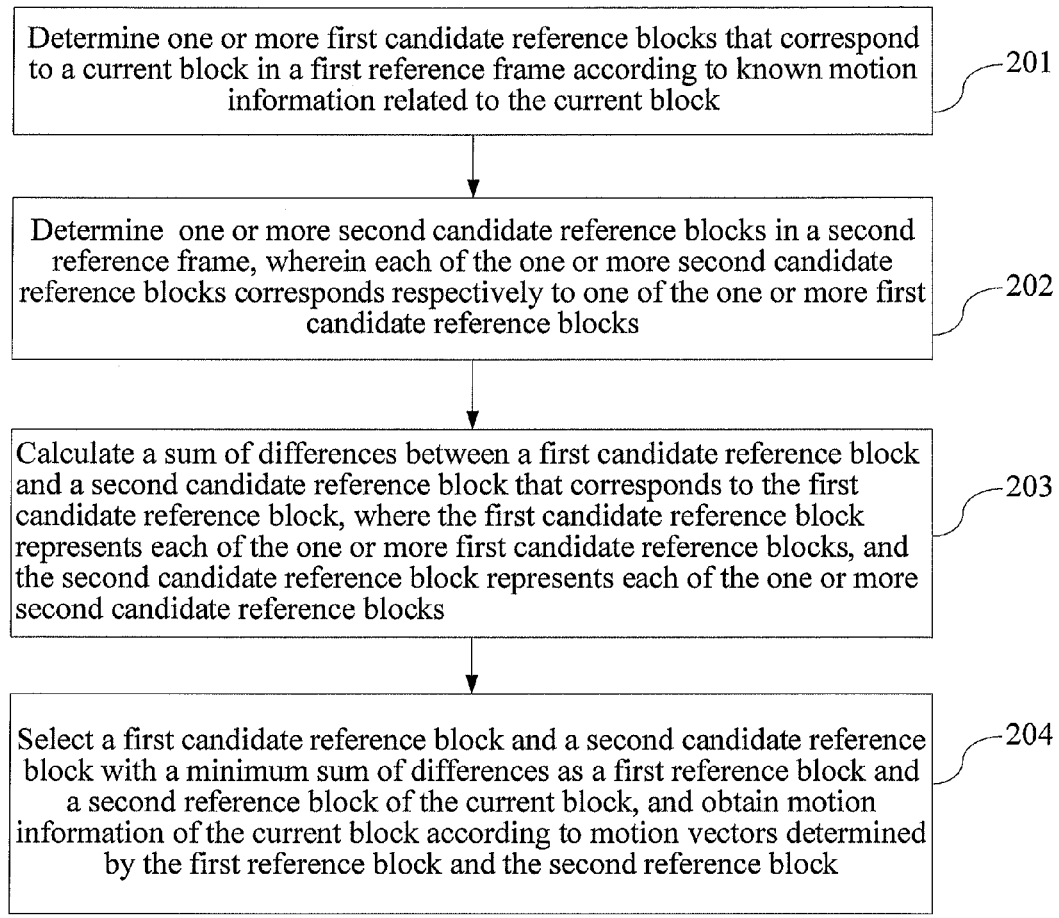
FIG. 2 is a flow chart of a method according to Embodiment 1.

As shown in FIG. 2, a method for obtaining motion information of video images provided in this embodiment includes the following steps.

201: Determine one or more first candidate reference blocks that correspond to a current block in a first reference frame according to known motion information related to the current block.

In this embodiment, the known motion information related to the current block may be motion vectors of encoded blocks or decoded blocks related in time or space to the current block.

Specifically, all or a part of the motion vectors of encoded blocks/decoded blocks related to the current block are selected to form a candidate motion vector set, and then a first candidate reference block is determined in the first reference frame correspondingly according to each candidate motion vector, so as to obtain a set of first candidate reference blocks.

202: Determine one or more second candidate reference blocks in a second reference frame, where each of the one or more second candidate reference blocks corresponds respectively to one of the one or more first candidate reference blocks.

A motion vector of each first candidate reference block to the current block is determined according to a position relation between the first candidate reference block and the current block, and each second candidate reference block that is respectively corresponding to each first candidate reference block is determined in the second reference frame according to the motion vector.

For example, in this embodiment, the second candidate reference block corresponding to the first candidate reference block in the second reference frame may be determined through symmetry searching, that is to say, after symmetry searching, the first candidate reference block and the found corresponding second candidate reference block are symmetrical in proportion with the current block as the center.

203: Calculate a sum of differences between a first candidate reference block and a second candidate reference block that corresponds to the first candidate reference block, where the first candidate reference block represents each of the one or more first candidate reference blocks, and the second candidate reference block represents each of the one or more second candidate reference blocks.

The sum of differences may be a sum of absolute differences (SAD), a sum of absolute transformation differences, or a sum of absolute squared differences, and definitely may also be other parameters for describing a similarity between two reference blocks; in this embodiment and the following embodiments, the sum of absolute differences is taken as an example to describe the solutions provided by the embodiment.

204: Select a first candidate reference block and a second candidate reference block with a minimum sum of differences as a first reference block and a second reference block of the current block, and obtain motion information of the current block according to motion vectors determined by the first reference block and the second reference block.

Figure 3:
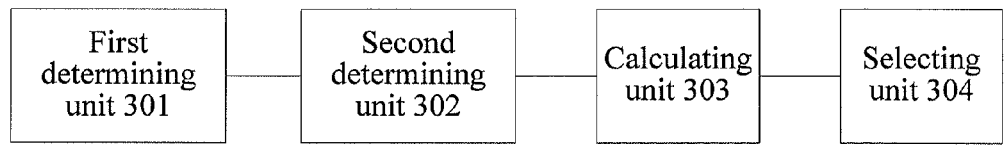
FIG. 3 is a schematic diagram of an apparatus according to Embodiment 1.

To better implement the method for obtaining motion information of video images, this embodiment further provides an apparatus for obtaining motion information of video images, which, as shown in FIG. 3, includes a first determining unit 301, a second determining unit 302, a calculating unit 303 and a selecting unit 304.

The first determining unit 301 is configured to determine one or more first candidate reference blocks that correspond to a current block in a first reference frame according to known motion information related to the current block. and, the second determining unit 302 is configured to determine one or more second candidate reference blocks in a second reference frame, wherein each of the one or more second candidate reference blocks corresponds respectively to one of the one or more first candidate reference blocks. and, the calculating unit 303 is configured to calculate a sum of differences between pixels of each of the one or more first candidate reference blocks and pixels of a second candidate reference block that is of the one or more second candidate reference blocks and that corresponds to the first candidate reference block. and, the selecting unit 304 is configured to select a first candidate reference block and a second candidate reference block with a minimum sum of differences as a first reference block and a second reference block of the current block, and obtains motion information of the current block according to motion vectors determined by the first reference block and the second reference block.

The order of the steps in the method provided in the embodiment may be adjusted according to actual demands.

According to the method and apparatus for obtaining motion information of video images provided in this embodiment, the policy of determining reference blocks in the reference block determining process is changed, which can reduce the complexity of implementation of the reference block determining process while maintaining the encoding performance basically unchanged, thereby improving the process of obtaining motion information in video images, and improving the encoding and decoding efficiency of video images.

Embodiment 2

Figure 4:
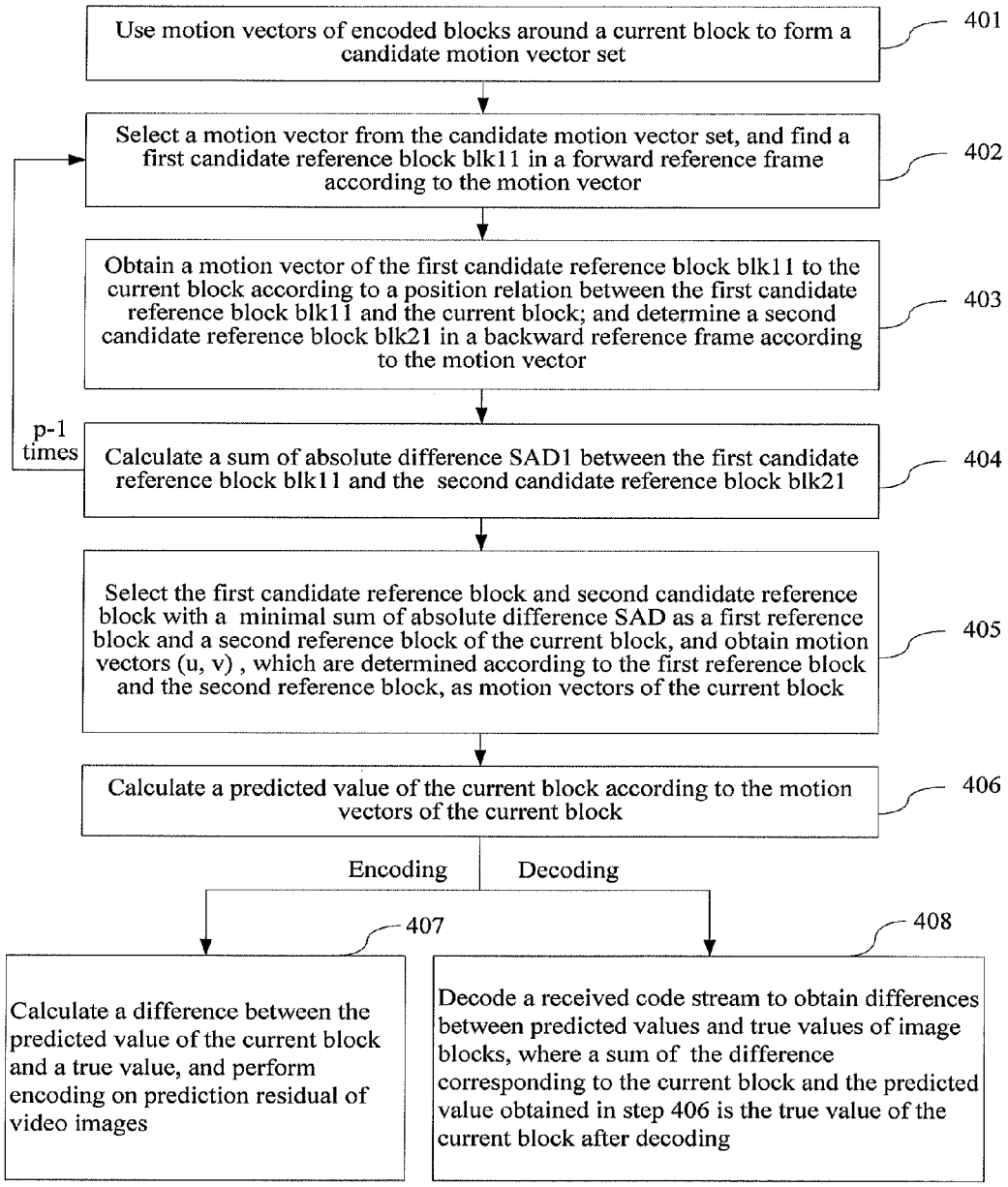
FIG. 4 is a flow chart of a method according to Embodiment 2.

Taking B frame encoding as an example, as shown in FIG. 4, a method for obtaining motion information of video images provided in this embodiment specifically includes the following steps.

401: Use motion vectors of encoded blocks around a current block to form a candidate motion vector set, which includes a part or all of motion vectors of encoded blocks related to the current block.

The current block may be a complete macro block or a partition block of a macro block, and a complete macro block is taken as an example here.

Figure 5:
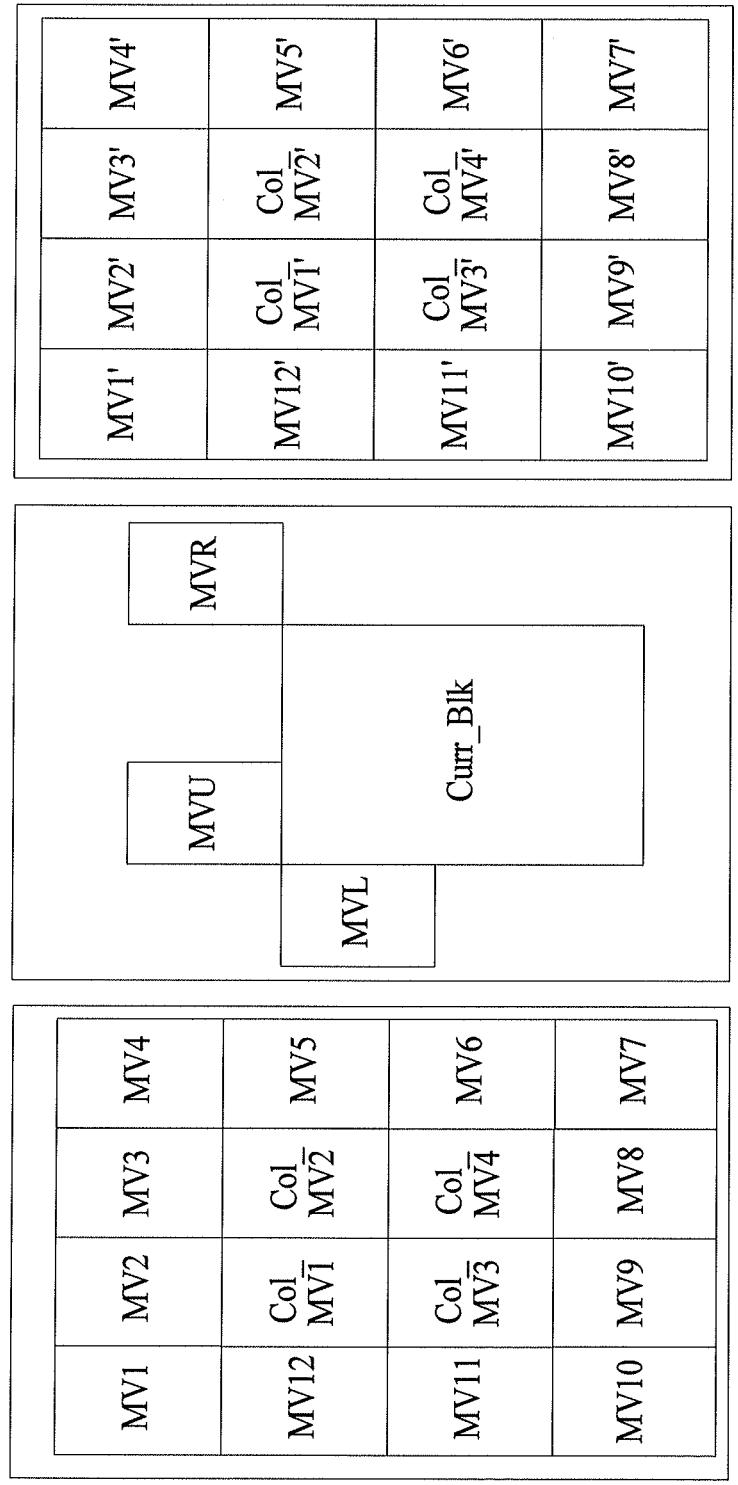
FIG. 5 is a first schematic structure diagram of a reference frame according to Embodiment 2.

The candidate motion vector set may include: all or a part of motion vectors MVL, MVU, MVR and MEAN (MVL, MVU, MVR) of neighboring blocks related in space to the current block (Curr_blk), motion vectors (col_MV1, col_MV2, col_MV3, and col_MV4 as shown in FIG. 5) in blocks that are in the corresponding position to that of the current block and are in a forward reference frame $f_{n-1}$ and motion vectors (MV1, MV2, . . . , MV12 as shown in FIG. 5) of neighboring blocks of the blocks that are in the corresponding position to that of the current block and are in the forward reference frame $f_{n-1}$ and motion vectors (col_MV1', col_MV2', col_MV3', and col_MV4' as shown in FIG. 5) in blocks that are in the corresponding position to that of the current block and are in a backward reference frame $f_{n+1}$ and motion vectors (MV1', MV2', . . . , MV12' as shown in FIG. 5) of neighboring blocks of the blocks that are in the corresponding position to that of the current block and are in the backward reference frame $f_{n+1}$, that is, include all or a part of left, up, up-left and up-right blocks of the current block, and left, up, up-left and up-right blocks of blocks that are in the corresponding position to that of the current block and are in reference frames, and the blocks that are in the corresponding position to that of the current block and are in the reference frames.

402: Select a motion vector from the candidate motion vector set, and find a first candidate reference block blk11 in a first reference frame (in this embodiment, the forward reference frame $f_{n-1}$ of the current frame is taken as the first reference frame) according to the motion vector.

403: Obtain a motion vector of the first candidate reference block blk11 to the current block according to a position relation between the first candidate reference block blk11 and the current block; and determine a second candidate reference block blk21 corresponding to the first candidate reference block blk11 in a second reference frame (in this embodiment, the backward reference frame $f_{n+1}$ of the current frame is taken as the second reference frame) according to the motion vector.

404: Calculate a sum of absolute differences SAD1 between the first candidate reference block blk11 and the second candidate reference block blk21.

After step 404 is executed, a motion vector is reselected from unselected motion vectors in the candidate motion vector set, to repeatedly execute steps 402 to 404; if the candidate motion vector set includes p motion vectors in total, the above steps need to be repeated for p−1 times, so as to sequentially determine first candidate reference blocks blk12, blk13, . . . and corresponding second candidate reference blocks blk22, blk23, . . . , and obtain sums of absolute differences SAD2, SAD3, . . . between every two corresponding candidate reference blocks.

405: Select the first candidate reference block and the second candidate reference block with a minimal SAD among the sums of absolute differences SAD1, SAD2, SAD3, . . . as a first reference block and a second reference block of the current block, and obtain motion vectors (u, v), which are determined according to the first reference block and the second reference block, as motion vectors of the current block.

406: Calculate a predicted value of the current block according to the motion vectors of the current block.

If the forward prediction frame $f_{n-1}$ and the backward prediction frame $f_{n+1}$ are equally distant from the current frame $f_n$, the predicted value of the current block may be calculated by using Equation (1):

$$f_n(x, y) = \left\{ f_{n-1}\left(x - \frac{1}{2}u, y - \frac{1}{2}v\right) + f_{n+1}\left(x + \frac{1}{2}u, y + \frac{1}{2}v\right) \right\} \Big/ 2 \quad (1)$$

If the forward prediction frame $f_{n-1}$ and the backward prediction frame $f_{n+1}$ are not equally distant from the current frame $f_n$, the predicted value of the current block may be calculated by using Equation (2):

$$f_n(x, y) = \left\{ d2 * f_{n-1}\left(x - \frac{d1}{d1+d2}u, y - \frac{d1}{d1+d2}v\right) + d1 * f_{n+1}\left(x + \frac{d2}{d1+d2}u, y + \frac{d2}{d1+d2}v\right) \right\} \Big/ (d1 + d2) \quad (2)$$

where, d1 is a distance from the forward prediction frame $f_{n-1}$ to the current frame $f_n$, and d2 is a distance from the backward prediction frame $f_{n+1}$ to the current frame $f_n$.

If the process proceeds to a video image encoding stage at this time, step 407 is executed; if the process proceeds to a video image decoding stage at this time, step 408 is executed.

407: Calculate a difference between the predicted value of the current block and a true value of the current block, and perform encoding on prediction residual of video images, i.e. differences between predicted values and true values of image blocks.

408: Decode a received code stream to obtain the differences between predicted values and true values of image blocks, where a sum of the difference corresponding to the current block and the predicted value obtained in step 406 is the true value of the current block after decoding.

In this embodiment, the serial numbers of the steps are not intended to limit the execution order of the steps, and the order of the steps in the method provided in the embodiment may be adjusted according to actual demands.

Moreover, to enable a decoding end to obtain more accurate motion information, in this embodiment, an encoding end may further obtain a difference between the obtained motion information and true motion information according to the obtained motion information, and send the difference of motion information to the decoding end; in addition, the predicted value of the current block is also calculated according to the true motion information, that is, a vector difference between the motion vectors (u, v) determined according to the first reference block and the second reference block as obtained in step 405 and true motion vectors that are of the current block and are obtained by motion search is calculated, and the motion vector difference is sent to the decoding end. In this way, after receiving data provided by the encoding end, the decoding end first recovers the true motion information according to the difference of motion information, and calculates the predicted value of the current block according to the true motion information and further reconstructs the current block.

Figure 6:
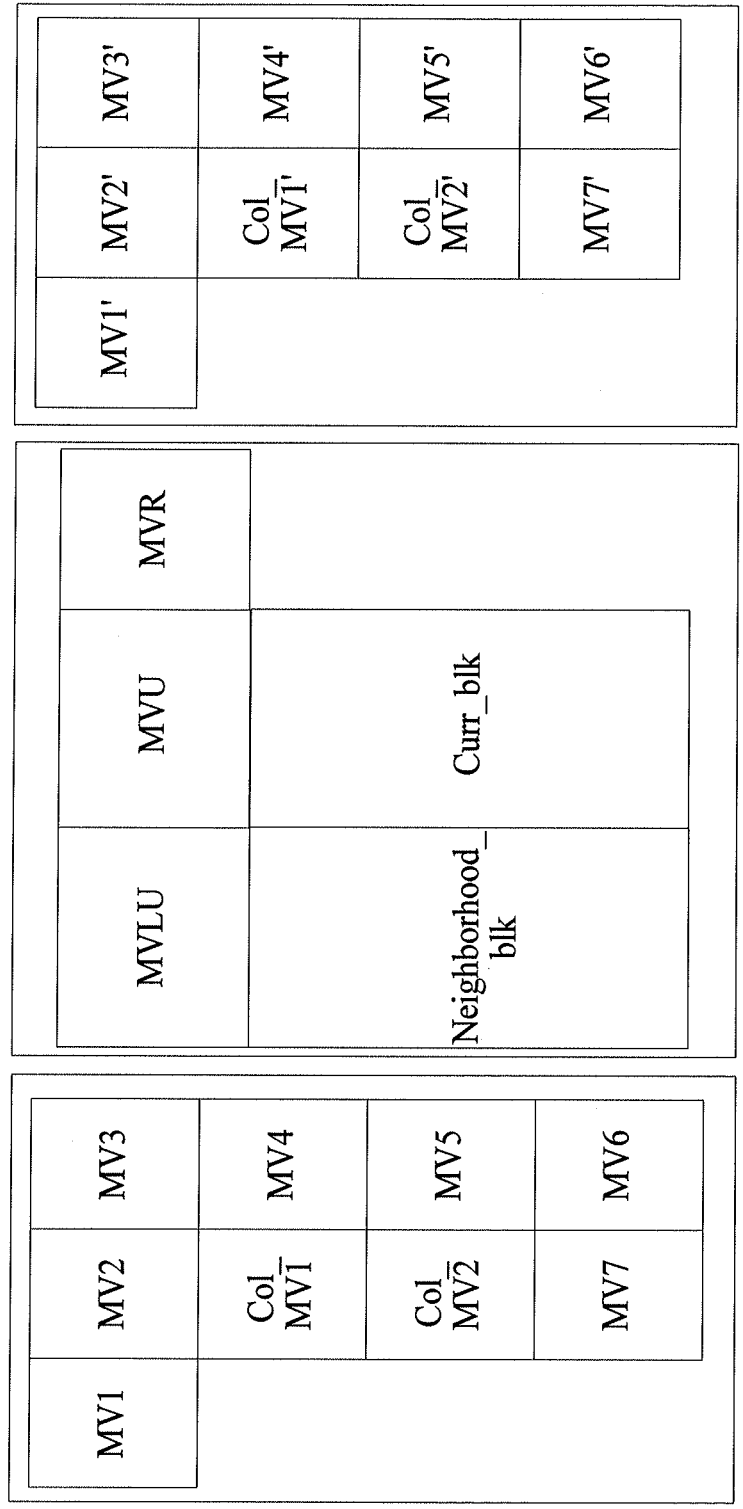
FIG. 6 is a second schematic structure diagram of a reference frame according to Embodiment 2.

If the current block is a partial partition block of a macro block in this embodiment, as shown in FIG. 6, when the candidate motion vector set is determined, motion vectors related to a Neighborhood_blk (that is, an image block neighboring to the current block, and belonging to the same macro block or sub-block as the current block) of the current block cannot be taken into consideration, so as to avoid an incorrect prediction of the current block due to the influence of the Neighborhoodblk; as can be seen from FIG. 6, at this time, the candidate motion vector set includes: all or a part of motion vectors MVLU, MVU and MVR of neighboring blocks related in space to the current block, motion vectors (col_MV1, col_MV2, MV1, MV2, . . . , MV7) in the forward reference frame $f_{n-1}$, and motion vectors (col_MV1', col_MV2', MV1', MV2', . . . , MV7') in the backward reference frame $f_{n+1}$.

The method for obtaining motion information of video images provided in this embodiment changes the policy of determining reference blocks in the reference block determining process, which can reduce the complexity of implementation of the reference block determining process while maintaining the encoding/decoding performance basically unchanged, thereby improving the process of obtaining motion information in video images, and improving the encoding and decoding efficiency of video images.

Embodiment 3

Figure 7:
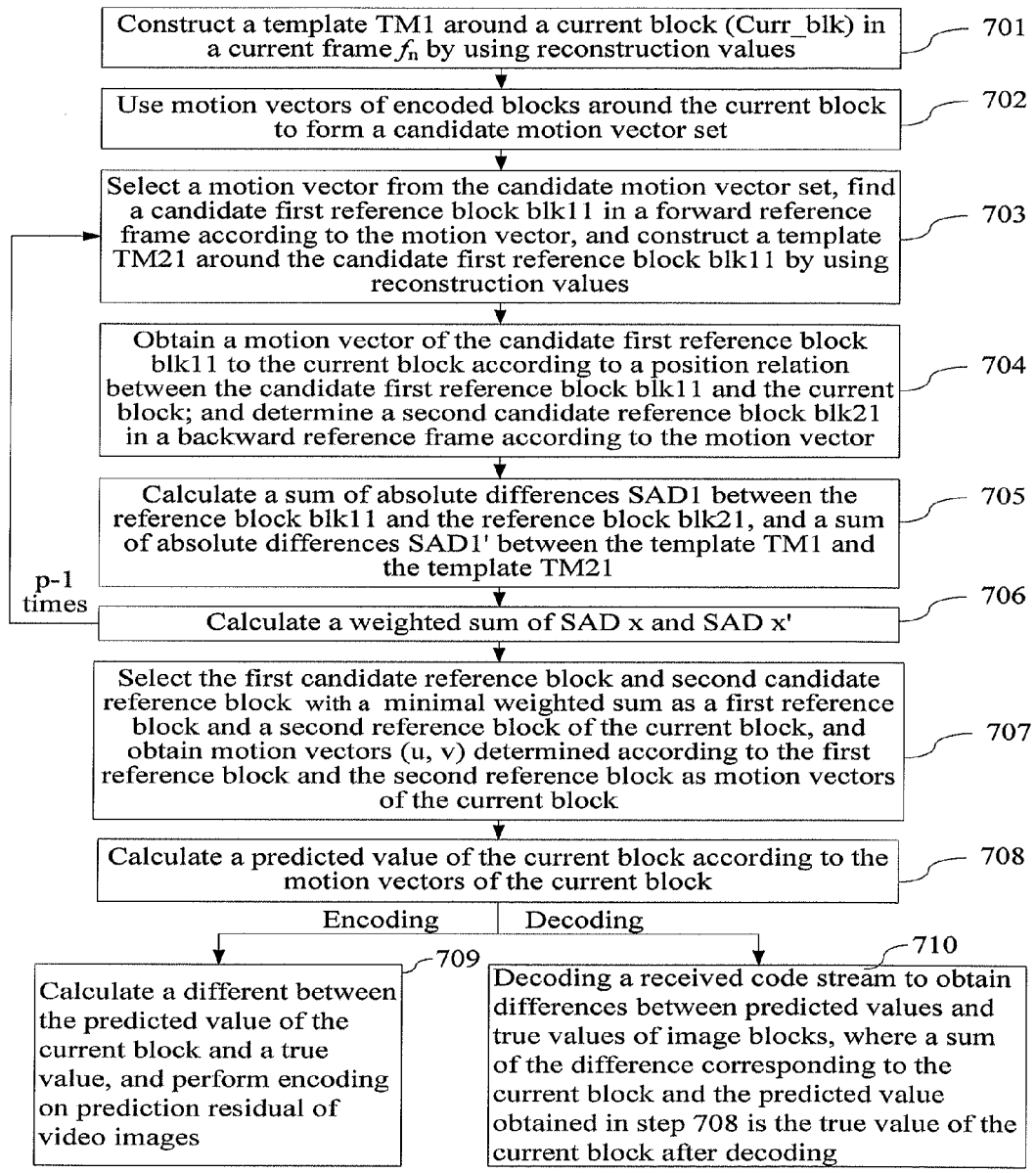
FIG. 7 is a flow chart of a method according to Embodiment 3.

To further improve the encoding and decoding performance, a template comparison method may be introduced into the method described in Embodiment 2; taking B frame encoding as an example, as shown in FIG. 7, a method for obtaining motion information of video images provided in this embodiment specifically includes the following steps.

701: Construct a template TM1 around a current block (Curr_blk) in a current frame $f_n$ by using reconstruction values.

702: Use motion vectors of encoded blocks around the current block to form a candidate motion vector set, which includes a part or all of motion vectors of encoded blocks related to the current block.

The current block may be a complete macro block or a partition block of a macro block, and a complete macro block is still taken as an example in the embodiment.

Figure 8:
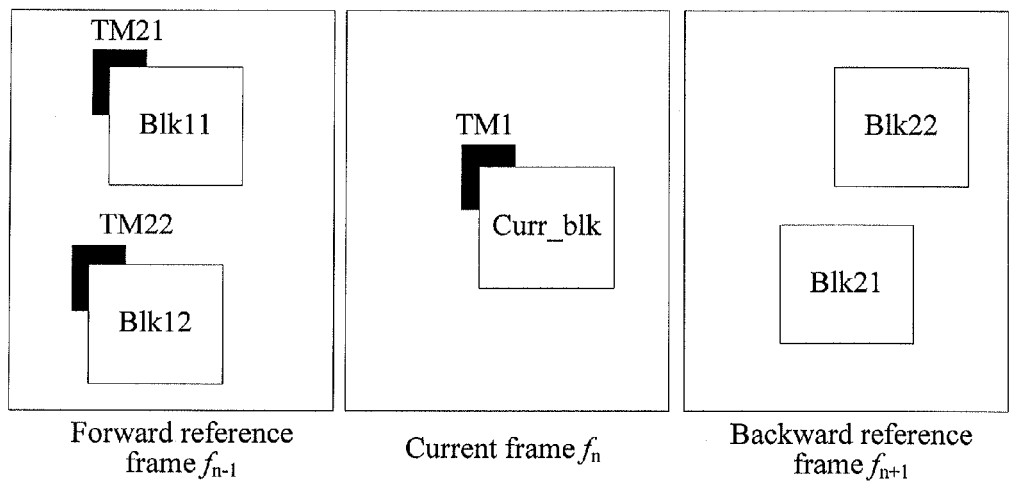
FIG. 8 is a first schematic structure diagram of a reference frame according to Embodiment 3.

703: Select a motion vector from the candidate motion vector set, find a first candidate reference block blk11 in a first reference frame (in this embodiment, the forward reference frame $f_{n-1}$ of the current frame is taken as the first reference frame) according to the motion vector, and construct a template TM21 around the first candidate reference block blk11 by using reconstruction values, as shown in FIG. 8.

704: Obtain a motion vector of the first candidate reference block blk11 to the current block according to a position relation between the first candidate reference block blk11 and the current block; and determine a second candidate reference block blk21 corresponding to the first candidate reference block blk11 in a second reference frame (in this embodiment, the backward reference frame $f_{n+1}$ of the current frame is taken as the second reference frame) according to the motion vector.

705: Calculate a sum of absolute differences SAD1 between the first candidate reference block blk11 and the second candidate reference block blk21, and a sum of absolute differences SAD1' between the template TM1 and the template TM21.

After step 705 is executed, a motion vector is reselected from unselected motion vectors in the candidate motion vector set, to repeatedly execute steps 703 to 705; if the candidate motion vector set includes p motion vectors in total, the above steps need to be repeated for p−1 times, so as to sequentially determine first candidate reference blocks blk12, blk13, . . . and corresponding second candidate reference blocks blk22, blk23, . . . and templates TM22, TM23, . . . , and obtain a sum of absolute differences SAD2, a sum of absolute differences SAD3, . . . between every two corresponding candidate reference blocks, and a sum of absolute differences SAD2' between the template TM1 and the templates TM22, a sum of absolute differences SAD3' between the template TM1 and TM23, . . . .

706: Calculate a weighted sum of SAD x and SAD x': SUMx=(a*SAD x+b*SAD x'), where x is a natural number from 1 to p, weight a of SAD x represents a degree of influence of reference block similarity on the encoding performance, and weight b of SAD x' represents a degree of influence of template similarity on the encoding performance.

For example, specific values of the weights a and b only need to satisfy the condition that a ratio of a to b is equal to a ratio of the area of the current block to the area of the template TM1.

707: Select the first candidate reference block and the second candidate reference block t with a minimum weighted sum among the weighted sums SUMx as a first reference block of the current block and a second reference block of the current block, and obtain motion vectors (u, v), where the motion vectors (u, v) are determined according to the first reference block and the second reference block, as motion vectors of the current block.

708: Calculate a predicted value of the current block according to the motion vectors of the current block.

If the forward prediction frame and the backward prediction frame $f_{n+1}$ are equally distant from the current frame $f_n$, the predicted value of the current block is calculated by using Equation (1):

$$f_n(x, y) = \left\{ f_{n-1}\left(x - \frac{1}{2}u, y - \frac{1}{2}v\right) + f_{n+1}\left(x + \frac{1}{2}u, y + \frac{1}{2}v\right) \right\} \Big/ 2 \quad (1)$$

If the forward prediction frame $f_{n-1}$ and the backward prediction frame $f_{n+1}$ are not equally distant from the current frame $f_n$, the predicted value of the current block is calculated by using Equation (2):

$$f_n(x, y) = \left\{ d2 * f_{n-1}\left(x - \frac{d1}{d1+d2}u, y - \frac{d1}{d1+d2}v\right) + d1 * f_{n+1}\left(x + \frac{d2}{d1+d2}u, y + \frac{d2}{d1+d2}v\right) \right\} \Big/ (d1 + d2) \quad (2)$$

where, d1 is a distance from the forward prediction frame $f_{n-1}$ to the current frame $f_n$, and d2 is a distance from the backward prediction frame $f_{n+1}$ to the current frame $f_n$.

If the process proceeds to a video image encoding stage at this time, step 709 is executed; if the process proceeds to a video image decoding stage at this time, step 710 is executed.

709: Calculate a difference between the predicted value of the current block and a true value of the current block, and perform encoding on prediction residual of video images, i.e. differences between predicted values and true values of image blocks.

710: Decode a received code stream to obtain the differences between predicted values and true values of image blocks, where a sum of the difference corresponding to the current block and the predicted value obtained in step 708 is the true value of the current block after decoding.

In this embodiment, the serial numbers of the steps are not intended to limit the execution order of the steps, and the order of the steps in the method provided in the embodiment may be adjusted according to actual demands.

Moreover, to enable a decoding end to obtain more accurate motion information, in this embodiment, an encoding end may further obtain a difference between the obtained motion information and true motion information according to the obtained motion information, and send the difference of motion information to the decoding end; in addition, the predicted value of the current block is also calculated according to the true motion information. In this way, after receiving data provided by the encoding end, the decoding end first recovers the true motion information according to the difference of motion information, and calculates the predicted value of the current block according to the true motion information and further reconstructs the current block.

If the current block is a partial partition block of a macro block in this embodiment, as shown in FIG. 6, when the candidate motion vector set is determined, motion vectors related to a Neighborhood_blk (that is, an image block neighboring to the current block, and belonging to the same macro block or sub-block as the current block) of the current block cannot be taken into consideration, so as to avoid an incorrect prediction of the current block due to the influence of the Neighborhood_blk.

Figure 9:
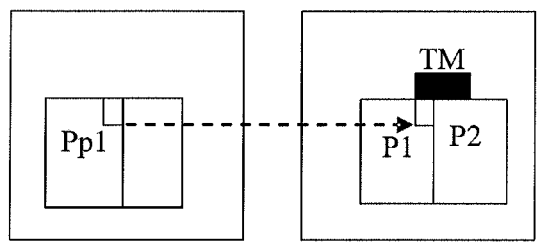
FIG. 9 is a second schematic structure diagram of a reference frame according to Embodiment 3.

In addition, when a template is constructed for the current block, as shown in FIG. 9, a template is constructed for a partition block p2, an upper half of the template may be constructed directly using reconstruction values of neighbor partition blocks around the current partition block p2, and for a left half (shaded portion), as reconstruction values of neighbor partition blocks cannot be directly obtained, a corresponding prediction partition block pp1 is found in a reference frame by using motion information of a partition block p1, and then use a predicted value in the prediction partition block pp1 corresponding to the shaded position as a value of the left half of a corresponding template of the partition block p2. In this way, the template construction method provided in the embodiment can use predicted values corresponding to a part of neighboring blocks of the current block to replace unknown reconstruction values of the part of the neighboring blocks of the current block when the current block is a partition block, so as to complete template construction for the current block, thereby solving the problem that reconstruction values of all neighboring blocks of the current block cannot be obtained when the current block is a partition block.

In another implementation scenario, a prediction block is obtained in a reference frame of neighboring macro block partition blocks by using motion information that is of the neighboring macro block partition blocks of a current macro block partition block and is obtained by decoding so as to construct a template of the current macro block partition block, a matching reference template of the template of the current macro block partition block is found in the reference frame of the current macro block partition block according to the template of the current macro block partition block, motion information of the current macro block partition block is obtained, and further the current macro block partition block is reconstructed by using a reference block corresponding to the matching reference template to compensate residual data of the current macro block partition block, or residual data of the current macro block partition block is obtained after the current macro block partition block is predicted by using a reference block corresponding to the matching reference template, where the residual data is used for the decoding end to reconstruct the current macro block partition block.

Figure 19:
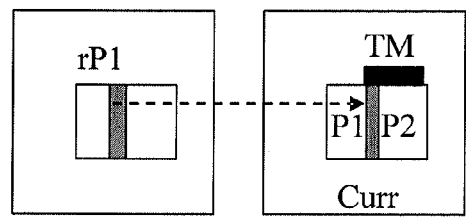
FIG. 19 is a schematic diagram of template decoding in the case of macro block partitioning according to Embodiment 3.

Specifically, as shown in FIG. 19, taking encoding of the current macro block according to 16×8 macro block partitioning as an example, when the current macro block curr is decoded, macro block type information and motion information MV1 of a macro block partition P1 of the current macro block are first obtained by decoding. If a current macro block partition P2 is encoded by using a template technology, a corresponding reference block is found in a reference frame of the macro block partition P1 by using the obtained motion information MV1 of the P1, and enough prediction pixels required for template formation are obtained. As shown in FIG. 19, prediction pixel blocks represented by gray blocks connected by a dashed arrow are used as the left half of the template of the current macro block partition P2, and meanwhile, neighboring reconstruction pixel blocks above the current macro block partition P2 are used to form a current template TM. Then, a most closely matching reference template of the current template TM is found in the reference frame. Motion information MV2 corresponding to the reference template is used as a motion vector of the current macro block partition P2, and meanwhile, a down-right reference block neighboring to the reference template as pointed to by the motion vector is used as a prediction block of the current macro block partition P2 to compensate a residual component of the current macro block partition P2, so as to reconstruct the current macro block partition P2.

Figure 20:
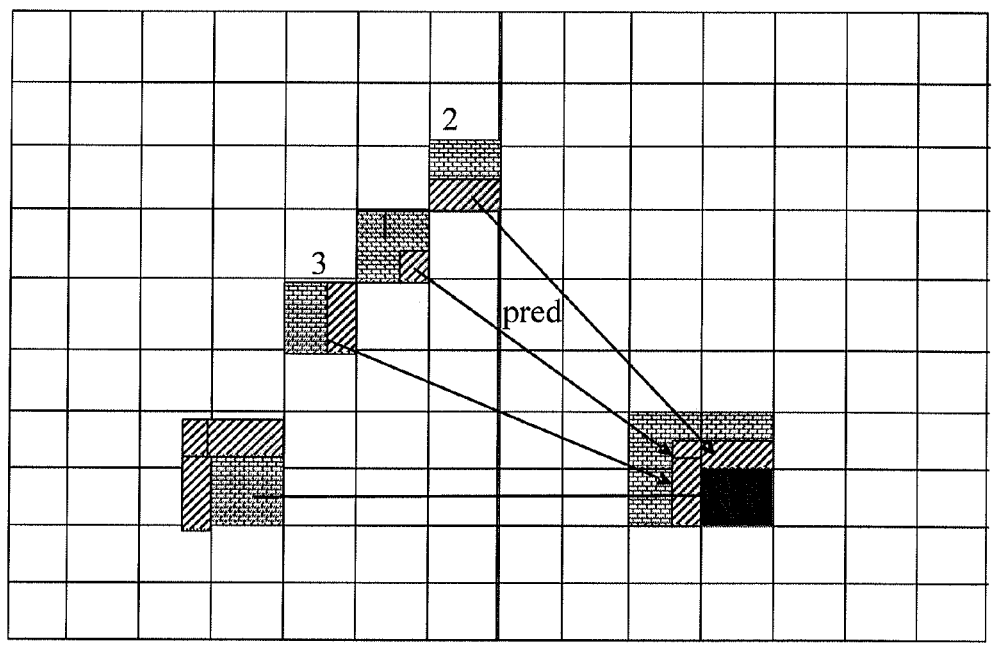
FIG. 20 is a schematic diagram of template decoding in the case of 8×8 macro block partitioning according to Embodiment 3.

FIG. 20 shows a template decoding process in the case of 8×8 macro block partitioning, where when a $4^{th}$ 8×8 block is decoded, corresponding prediction blocks 1, 2 and 3 are obtained in a reference frame first by using motion vectors of neighboring sub-blocks, and are combined to form a current template, the current template is used to match against the reference template in the reference frame to find a predicted value of the current block by search, and the obtained predicted value of the current block is used to compensate a residual value of the current block, so as to reconstruct the current block. Correspondingly, in an encoding process, the current template obtained by combination is used to match against the reference template to find the predicted value of the current block by search, the obtained predicted value of the current block is used to predict the residual value of the current block, and the residual value is encoded.

In another implementation scenario, as shown in FIG. 20, the current macro block is encoded according to 8×8 macro block partitioning. When the current macro block curr is decoded, macro block type information and motion information MV1, MV2, MV3 and MV4 of macro block partitions of the current macro block are first obtained by decoding. If a current macro block partition is encoded using a template technology, corresponding reference blocks (1, 2 and 3 as shown in FIG. 20) are found in a reference frame of a corresponding macro block partition by using the obtained motion information MV1, MV2 and MV3 of the macro block partitions, and enough prediction pixels required for template formation are obtained. As shown in FIG. 20, prediction pixel blocks represented by yellow blocks connected by arrows are used as the left half and the upper half of the template of the current macro block partition to form a current template TM. Then, a matching reference template TMref of the current template TM is found in the reference frame. The TM and the TMref are used to calculate a brightness difference IDCO of the current macro block partition, and IDCO=(TM−Tmref)/Num, where Num represents the number of pixels included in the template. Meanwhile, the brightness difference is used to update the predicted value pred of the current block to obtain an updated predicted value pred', and pred' (i, j)=pred (i, j)+IDCO, where (i, j) represents the position of a pixel point. The updated predicted value pred' is used to compensate a residual value, so as to reconstruct a current macro block partition. The implementation adapts to current modular requirements of decoder hardware designing, reduces the frequency of data reading, improves the efficiency of data reading, reduces the number of times of module switching, and enables the application of the template technology to macro block partitioning.

The method for obtaining motion information of video images provided in this embodiment changes the policy of determining reference blocks in the reference block determining process, and further introduces template similarity comparison during reference block similarity comparison, which makes the reference block determining process more accurate, and can reduce the complexity of implementation of the search process while maintaining the encoding/decoding performance basically unchanged, thereby improving the process of obtaining motion information in video images, and improving the encoding and decoding efficiency of video images.

Embodiment 4

Figure 10:
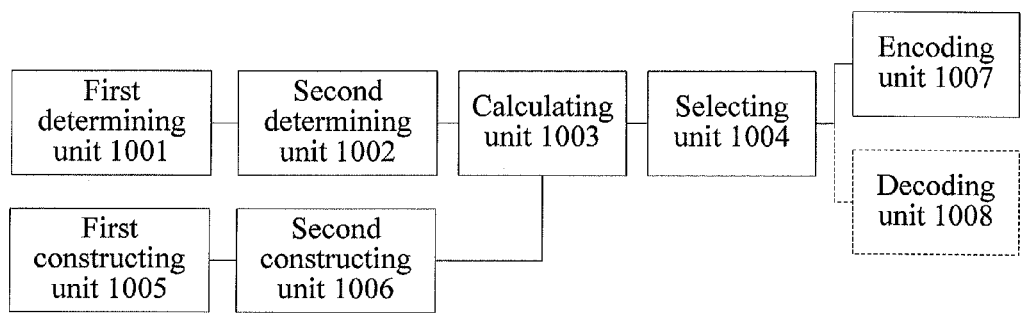
FIG. 10 is a schematic diagram of an apparatus according to Embodiment 4.

As shown in FIG. 10, an apparatus for obtaining motion information of video images provided in this embodiment includes a first determining unit 1001, a second determining unit 1002, a calculating unit 1003 and a selecting unit 1004.

The first determining unit 1001 is configured to determine one or more first candidate reference blocks that correspond to a current block in a first reference frame according to known motion information related to the current block. and, the second determining unit 1002 is configured to determines one or more second candidate reference blocks that respectively correspond to the one or more first candidate reference blocks in a second reference frame through symmetry searching. and, the calculating unit 1003 is configured to calculate a sum of differences between each of the one or more first candidate reference blocks and a second candidate reference block that is of the one or more second candidate reference blocks and that corresponds to the first candidate reference block. and, the selecting unit 1004 is configured to select a first candidate reference block and a second candidate reference block with a minimum sum of differences as a first reference block and a second reference block of the current block, and obtains motion information of the current block according to motion vectors determined by the first reference block and the second reference block.

Further, the apparatus for obtaining motion information of video images provided in this embodiment may further include a first constructing unit 1005 and a second constructing unit 1006.

The first constructing unit 1005 is configured to construct a template around the current block by using reconstruction values. The second constructing unit 1006 is configured to respectively construct a template for each first candidate reference block in the one or more first candidate reference blocks around the each first candidate reference block in the first reference frame by using reconstruction values. At this time, the calculating unit 1003 is specifically configured to calculate the sum of absolute differences between a first candidate reference block and a second candidate reference block that corresponds to the first candidate reference block and a sum of absolute differences between the template that is around the first candidate reference block and the template that is around the current block, and calculate a weighted sum of the two sums. The selecting unit 1004 is configured to select the first candidate reference block and the second candidate reference block with a minimum weighted sum as the first reference block and the second reference block of the current block. Motion information between the first reference block and the second reference block is the motion information of the current block.

Moreover, the apparatus for obtaining motion information of video images provided in this embodiment may further include an encoding unit 1007, configured to calculate a predicted value of the current block by using the motion information that is of the current block and is obtained according to the motion information determined by the first reference block and the second reference block, and perform encoding on prediction residual.

Alternatively, the apparatus may further include a decoding unit 1008, configured to calculate a predicted value of the current block by using the motion information that is of the current block and is obtained according to the motion information determined by the first reference block and the second reference block, and decode a received code stream.

The apparatus according to the embodiment may be specifically embodied in the form of a circuit, an integrated circuit or a chip.

The apparatus for obtaining motion information of video images provided in this embodiment changes the policy of determining reference blocks in the reference block determining process, which can reduce the complexity of implementation of the reference block determining process while maintaining the encoding performance basically unchanged, thereby improving the process of obtaining motion information in video images, and improving the encoding and decoding efficiency of video images.

Embodiment 5

Figure 11:
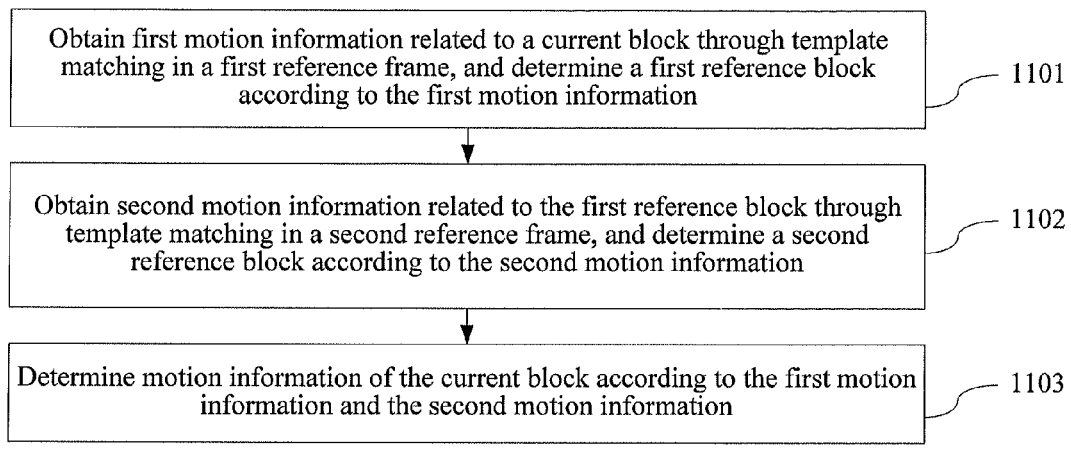
FIG. 11 is a flow chart of a method according to Embodiment 5.

As shown in FIG. 11, a method for obtaining motion information of video images provided in this embodiment includes the following steps.

1101: Obtain first motion information related to a current block through template matching in a first reference frame, and determine a first reference block according to the first motion information.

1102: Obtain second motion information related to the first reference block through template matching in a second reference frame, and determine a second reference block according to the second motion information.

1103: Determine motion information of the current block according to the first motion information and the second motion information.

Figure 12:
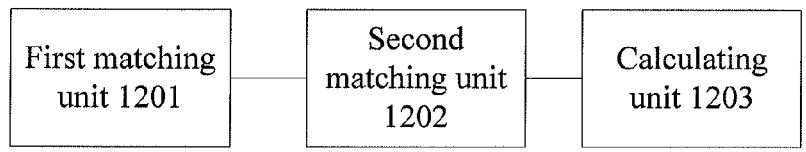
FIG. 12 is a schematic diagram of an apparatus according to Embodiment 5.

To better implement the method for obtaining motion information of video images, this embodiment further provides an apparatus for obtaining motion information of video images, which, as shown in FIG. 12, includes a first matching unit 1201, a second matching unit 1202 and a calculating unit 1203.

In a process of obtaining motion information of video images, first, the first matching unit 1201 obtains first motion information related to a current block through template matching in a first reference frame, and determines a first reference block according to the first motion information. Then, the second matching unit 1202 obtains second motion information related to the first reference block through template matching in a second reference frame, and determines a second reference block according to the second motion information. Afterwards, the calculating unit 1203 calculates motion information of the current block according to the first motion information and the second motion information.

The order of the steps in the method provided in the embodiment may be adjusted according to actual demands.

The method and apparatus for obtaining motion information of video images provided in this embodiment introduce a factor of motion estimation in the process of searching reference blocks through template matching, thereby obtaining more accurate motion information than that in the prior art.

Embodiment 6

Figure 13:
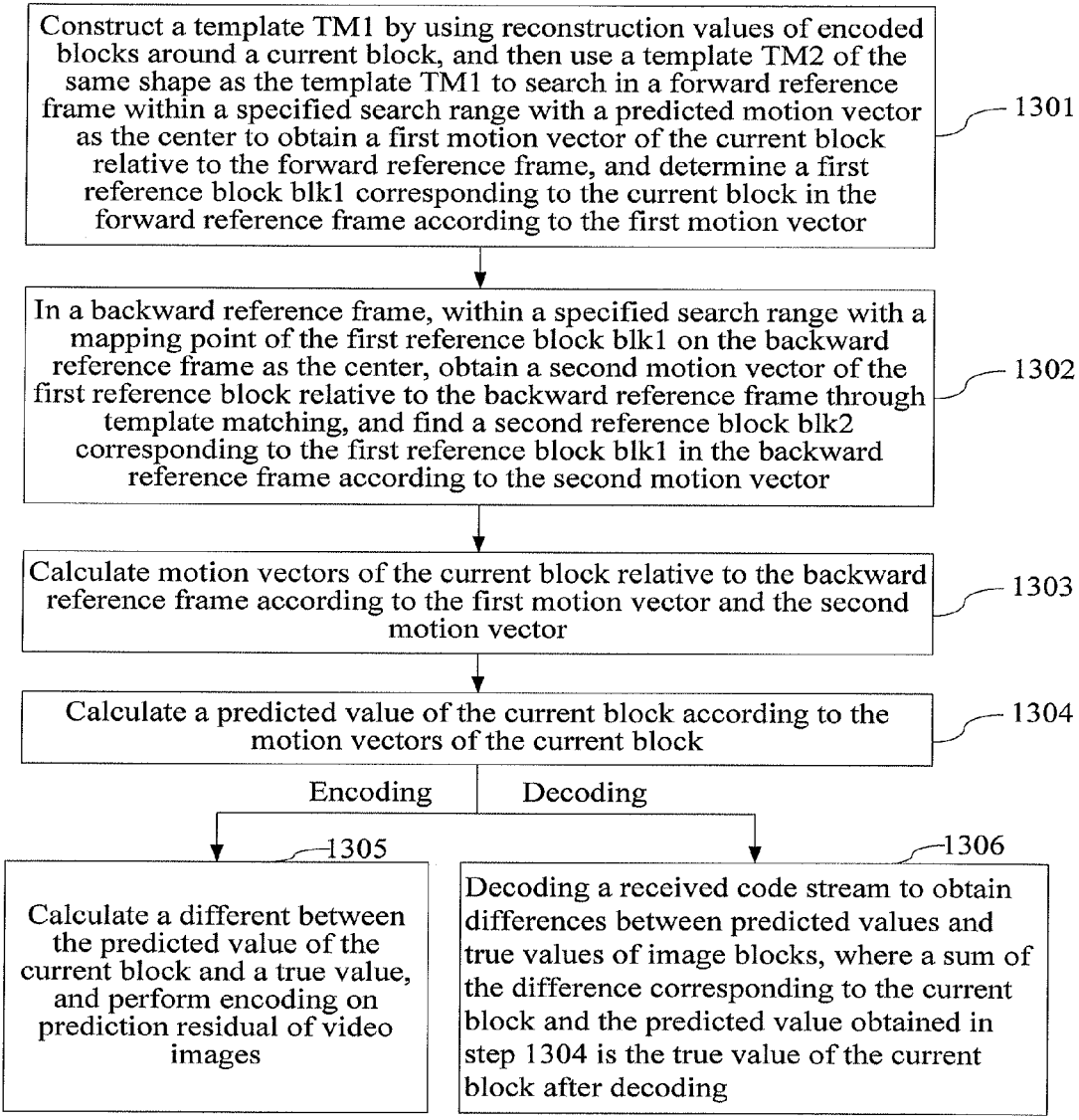
FIG. 13 is a flow chart of a method according to Embodiment 6.
Figure 14:
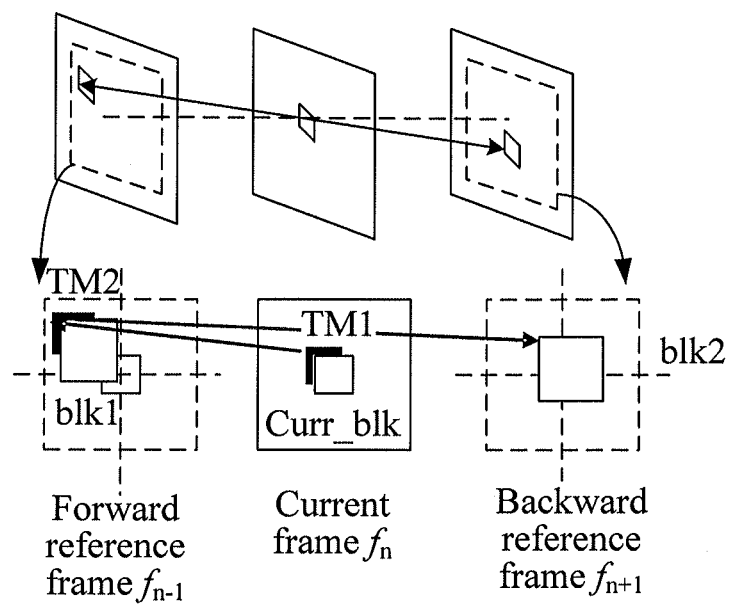
FIG. 14 is a schematic structure diagram of a reference frame according to Embodiment 6.

Taking B frame encoding as an example, as shown in FIG. 13 and FIG. 14, a method for obtaining motion information of video images provided in this embodiment specifically includes the following steps.

1301: Construct a template TM1 by using reconstruction values of encoded blocks around a current block, and then use a template TM2 of the same shape as the template TM1 to search in a first reference frame (for example, a forward reference frame of the current frame) within a specified search range with a predicted motion vector as the center to obtain a first motion vector (u1, v1) of the current block relative to the forward reference frame, and determine a first reference block blk1 corresponding to the current block in the forward reference frame according to the first motion vector.

In this embodiment, the first reference frame is not limited to the forward reference frame $f_{n-1}$ of the current frame, and definitely a backward reference frame $f_{n+1}$ of the current frame may be taken as the first reference frame, and the forward reference frame of the current frame may be taken as a second reference frame.

The current block may be a complete macro block or a partition block of a macro block, and a complete macro block is taken as an example here.

In addition, the process of determining the first motion vector (u1, v1) related to the current block is: within the specified search range with the predicted motion vector as the center, when the matching error between the templates TM2 and TM1 (may be measured by using a sum of absolute difference SAD between the templates TM2 and TM1) is minimal, a motion vector (u1, v1) of the template TM1 to the template TM2 is the first motion vector of the current block relative to the forward reference frame, and at this time, the block found in the forward reference frame according to the first motion vector (u1, v1) is the first reference block blk1 corresponding to the current block.

1302: In a second reference frame (for example, a backward reference frame), within a specified search range with a mapping point of the first reference block blk1 on the backward reference frame as the center, obtain a second motion vector (u, v) of the first reference block relative to the backward reference frame through template matching, and determine a second reference block blk2 corresponding to the first reference block blk1 in the backward reference frame according to the second motion vector.

1303: Calculate motion information of the current block relative to the backward reference frame according to the first motion vector (u1, v1) and the second motion vector (u, v).

In this embodiment, a motion vector of the current block to the second reference block blk2 is the motion information of the current block relative to the backward reference frame; specifically, a motion vector of the current block relative to the backward reference frame is $$(u2,v2)=(u,v)+(u1,v1) \tag{3}$$

1304: Calculate a predicted value of the current block according to the motion vectors of the current block.

The motion vectors of the current block include the motion vector (u1, v1) of the current block relative to the forward reference frame $f_{n-1}$ and the motion vector (u2, v2) of the current block relative to the backward reference frame $f_{n+1}$. In a case where the forward prediction frame $f_{n-1}$ and the backward prediction frame $f_{n+1}$ are equally distant from the current frame $f_n$, the predicted value of the current block curr_blk may be calculated directly according to Equation (4):

$$f_n(x,y)=\{f_{n-1}(x+u1,y+v1)+f_{n+1}(x+u2,y+v2)\}/2 \tag{4}$$

Alternatively, more accurately, in consideration of a case where the forward prediction frame $f_{n-1}$ and the backward prediction frame $f_{n+1}$ are not equally distant from the current frame $f_n$, the predicted value of the current block curr_blk may be calculated according to Equation (5):

$$f_n(x, y) = \frac{w2}{w1 + w2} f_{n-1}(x, y) + \frac{w1}{w1 + w2} f_{n+1}(x, y) \tag{5}$$

where, $w1=\sqrt{u1^2+v1^2}$, and $w2=\sqrt{u2^2+v2^2}$.

If the process proceeds to a video image encoding stage at this time, step 1305 is executed; if the process proceeds to a video image decoding stage at this time, step 1306 is executed.

1305: Calculate a difference between the predicted value of the current block and a true value of the current block, and perform encoding on prediction residual of video images, i.e. differences between predicted values and true values of image blocks.

1306: Decode a received code stream to obtain the differences between predicted values and true values of image blocks, where a sum of the difference corresponding to the current block and the predicted value obtained in step 1304 is the true value of the current block after decoding.

In this embodiment, the serial numbers of the steps are not intended to limit the execution order of the steps, and the order of the steps in the method provided in the embodiment may be adjusted according to actual demands.

Moreover, to enable a decoding end to obtain more accurate motion information, in this embodiment, an encoding end may further obtain a difference between the obtained motion information and true motion information according to the obtained motion information, and send the difference of motion information to the decoding end. In this way, after receiving data provided by the encoding end, the decoding end first obtains the difference of motion information by parsing, and recovers the true motion information according to the predicted value of the current block, and further reconstructs the current block according to the true motion information.

If the current block is a partial partition block of a macro block in this embodiment, the method for constructing a template for the current block is the same as that in Embodiment 3, so that the details will not be described herein again.

The method for obtaining motion information of video images provided in this embodiment introduces a factor of motion estimation in the process of searching reference blocks through template matching, thereby obtaining more accurate motion information than that in the prior art.

Embodiment 7

Taking B frame encoding as an example, during encoding, generally a forward reference frame is used as a first reference frame, and a backward reference frame is used as a second reference frame; however, sometimes, a better encoding effect can be obtained by using the backward reference frame as the first reference frame. Accordingly, in this embodiment, as a further improvement to Embodiment 6, a reference frame most suitable for being used as the first reference frame for prediction of the current frame is determined first before encoding.

Figure 15:
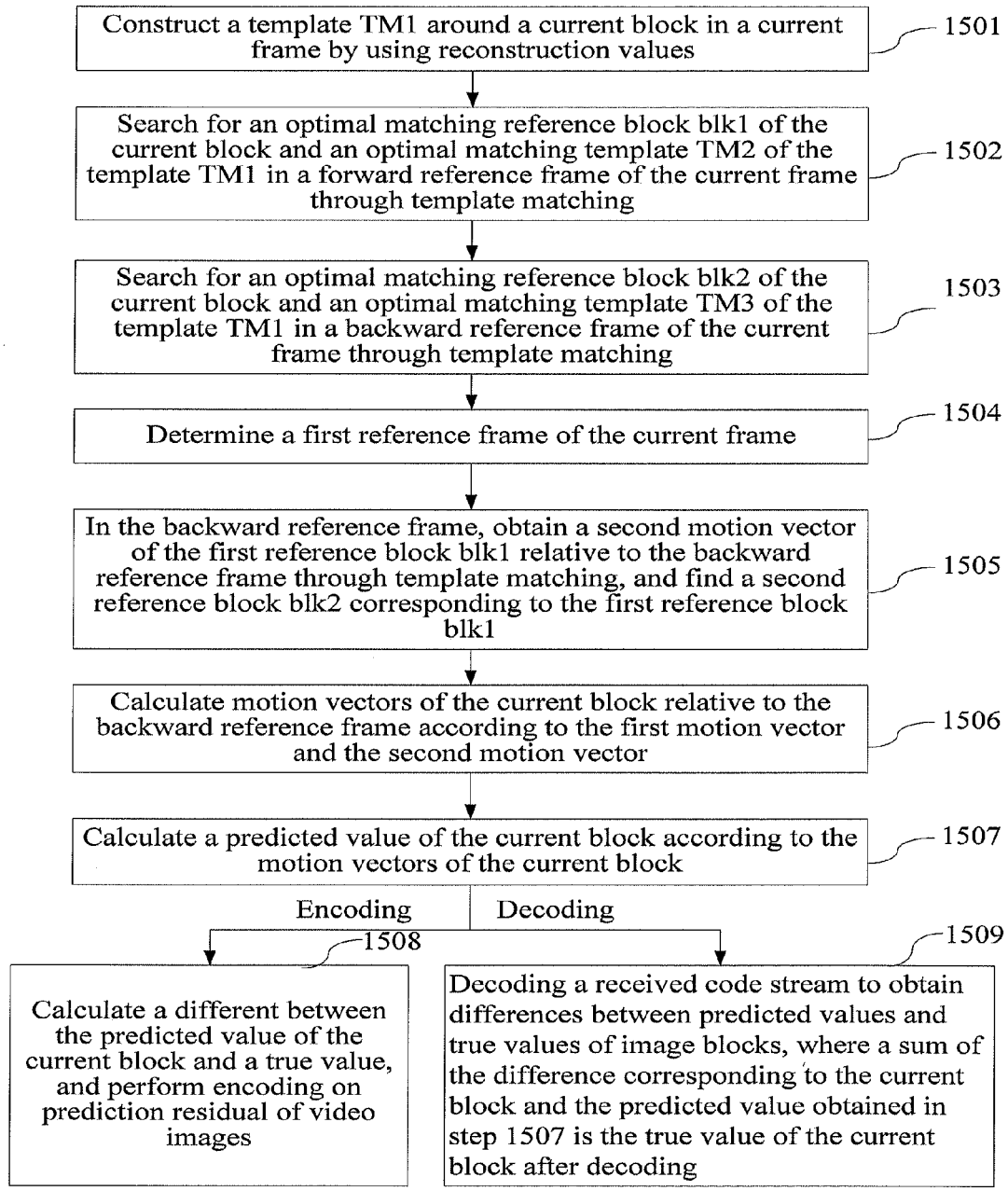
FIG. 15 is a flow chart of a method according to Embodiment 7.

Specifically, as shown in FIG. 15, a method for obtaining motion information of video images provided in this embodiment includes the following steps.

1501: Construct a template TM1 around a current block in a current frame $f_n$ by using reconstruction values.

The current block may be a complete macro block or a partition block of a macro block, and a complete macro block is still taken as an example here.

1502: Search for an optimal matching reference block blk1 of the current block and an optimal matching template TM2 of the template TM1 in a forward reference frame of the current frame through template matching; in addition, a sum of absolute differences between the current block and the reference block blk1 is SAD1, and a sum of absolute differences between the template TM1 and the template TM2 is SAD3.

1503: Search for an optimal matching reference block blk2 of the current block and an optimal matching template TM3 of the template TM1 in a backward reference frame of the current frame through template matching; in addition, a sum of absolute differences between the current block and the reference block blk2 is SAD2, and a sum of absolute differences between the template TM1 and the template TM3 is SAD4.

1504: Determine a first reference frame of the current frame according to the sums of absolute differences obtained in step 1502 and step 1503.

Specifically, if SAD1 and SAD2 satisfy SAD1−SAD2≥0, or SAD3 and SAD4 satisfy SAD3−SAD4≥0, the forward reference frame of the current frame is taken as the first reference frame, and a matching direction flag flag=0 is added in a code stream, and accordingly a decoding end searches for a first reference block of the current block in the forward reference frame according to the matching direction flag; otherwise, the backward reference frame of the current frame is taken as the first reference frame, and a matching direction flag flag=1 is added in the code stream, and accordingly the decoding end searches for a first reference block of the current block in the backward reference frame according to the matching direction flag.

An example where the forward reference frame of the current frame is the first reference frame, that is, flag=0, is given below. In this case, a first motion vector of the current block to the reference block blk1 is (u1, v1), and the method for obtaining motion information of video images provided in this embodiment further includes the following steps.

1505: In a second reference frame (for example, the backward reference frame), within a specified search range with a mapping point of the reference block blk1 on the backward reference frame as the center, obtain a second motion vector (u, v) of the reference block relative to the backward reference frame through template matching, and determine a reference block blk2' corresponding to the reference block blk1 in the backward reference frame according to the second motion vector.

1506: Calculate motion information of the current block relative to the backward reference frame according to the first motion vector (u1, v1) and the second motion vector (u, v).

In this embodiment, a motion vector of the current block to the reference block blk2' is the motion information of the current block relative to the backward reference frame; specifically, a motion vector of the current block relative to the backward reference frame is $$(u2,v2)=(u,v)+(u1,v1) \quad (3)$$

1507: Calculate a predicted value of the current block according to the motion vectors of the current block.

The motion vectors of the current block include the motion vector (u1, v1) of the current block relative to the forward reference frame $f_{n-1}$ and the motion vector (u2, v2) of the current block relative to the backward reference frame $f_{n+1}$. In a case where the forward prediction frame $f_{n-1}$ and the backward prediction frame $f_{n+1}$ are equally distant from the current frame $f_n$, the predicted value of the current block curr_blk may be calculated directly according to Equation (4):

$$f_n(x,y)=\{f_{n-1}(x+u1,y+v1)+f_{n+1}(x+u2,y+v2)\}/2 \quad (4)$$

Alternatively, more accurately, in consideration of a case where the forward prediction frame $f_{n-1}$ and the backward prediction frame $f_{n+1}$ are not equally distant from the current frame $f_n$, the predicted value of the current block curr_blk may be calculated according to Equation (5):

$$f_n(x,y) = \frac{w2}{w1+w2} f_{n-1}(x,y) + \frac{w1}{w1+w2} f_{n+1}(x,y) \quad (5)$$

where, $w1=\sqrt{u1^2+v1^2}$, and $w2=\sqrt{u2^2+v2^2}$.

If the process proceeds to a video image encoding stage at this time, step 1508 is executed; if the process proceeds to a video image decoding stage at this time, step 1509 is executed.

1508: Calculate a difference between the predicted value of the current block and a true value of the current block, and perform encoding on prediction residual of video images, i.e. differences between predicted values and true values of image blocks.

1509: Decode a received code stream to obtain the differences between predicted values and true values of image blocks, where a sum of the difference corresponding to the current block and the predicted value obtained in step 1507 is the true value of the current block after decoding.

In this embodiment, the serial numbers of the steps are not intended to limit the execution order of the steps, and the order of the steps in the method provided in the embodiment may be adjusted according to actual demands.

Moreover, to enable the decoding end to obtain more accurate motion information, in this embodiment, an encoding end may further obtain a difference between the obtained motion information and true motion information according to the obtained motion information, and send the difference of motion information to the decoding end. In this way, after receiving data provided by the encoding end, the decoding end first obtains the difference of motion information by parsing, and calculates the true motion information according to prediction information of the current block and further reconstructs the current block.

If the current block is a partial partition block of a macro block in this embodiment, the method for constructing a template for the current block is the same as that in Embodiment 3, so that the details will not be described herein again.

The method for obtaining motion information of video images provided in this embodiment introduces a factor of motion estimation in the process of searching reference blocks through template matching, and determines a first reference frame according to reference block matching degrees or template matching degrees between the current frame and different reference frames before encoding, which further optimizes the encoding and decoding of video images, thereby obtaining more accurate motion information than that in the prior art.

Embodiment 8

Figure 16:
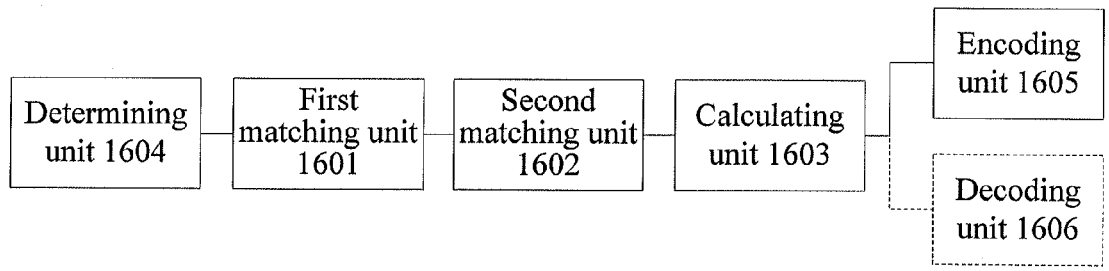
FIG. 16 is a schematic diagram of an apparatus according to Embodiment 8.

As shown in FIG. 16, an apparatus for obtaining motion information of video images provided in this embodiment includes a first matching unit 1601, a second matching unit 1602 and a calculating unit 1603.

In a process of obtaining motion information of video images, first, the first matching unit 1601 obtains first motion information related to a current block through template matching in a first reference frame, and determines a first reference block according to the first motion information. Then, the second matching unit 1602 obtains second motion information related to the first reference block through template matching in a second reference frame, and determines a second reference block according to the second motion information. Afterwards, the calculating unit 1603 calculates motion information of the current block according to the first motion information and the second motion information.

In this embodiment, the apparatus for obtaining motion information of video images may further include a determining unit 1604, where the determining unit 1604 is configured to determine the first reference frame of the current frame before encoding.

Specifically, if the apparatus provided in this embodiment is located at an encoding end, a sum of absolute differences between the current block and a reference block blk1 of the current block in a forward reference frame is SAD1, and a sum of absolute differences between the current block and a reference block blk2 of the current block in a backward reference frame is SAD2; a sum of absolute differences between a template TM1 corresponding to the current block and a matching template TM2 of the template TM1 in the forward reference frame is SAD3, and a sum of absolute differences between the template TM1 and a matching template TM3 of the template TM1 in the backward reference frame is SAD4. If SAD1 and SAD2 satisfy SAD1−SAD2≥0, or SAD3 and SAD4 satisfy SAD3−SAD4≥0, the forward reference frame of the current frame is taken as the first reference frame, and a matching direction flag flag=0 is added in a code stream; otherwise, the backward reference frame of the current frame is taken as the first reference frame, and a matching direction flag flag=1 is added in the code stream.

If the apparatus provided in this embodiment is located at a decoding end, the determining unit 1604 may judge the first reference frame of the current frame directly according to the matching direction flag in the code stream.

Moreover, the apparatus for obtaining motion information of video images provided in this embodiment may further include an encoding unit 1605, configured to calculate a predicted value of the current block according to the motion information of the current block, and perform encoding on prediction residual.

Alternatively, the apparatus may further include a decoding unit 1606, configured to calculate a predicted value of the current block according to the motion information of the current block, and decode a received code stream.

The apparatus according to the embodiment may be specifically embodied in the form of a circuit, an integrated circuit or a chip.

The apparatus for obtaining motion information of video images provided in this embodiment introduces a factor of motion estimation in the process of searching reference blocks through template matching, and determines a first reference frame according to reference block matching degrees or template matching degrees between the current frame and different reference frames before encoding, which further optimizes the encoding and decoding of video images, thereby obtaining more accurate motion information than that in the prior art.

Embodiment 9

Figure 17:
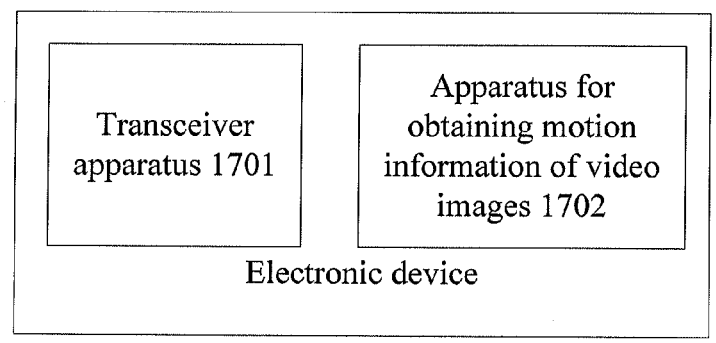
FIG. 17 is a schematic diagram of an electronic device according to Embodiment 9.

As shown in FIG. 17, the embodiment further provides an electronic device, which includes a transceiver apparatus 1701 and the apparatus 1702 for obtaining motion information of video images provided in Embodiment 4 or Embodiment 8.

The transceiver apparatus 1701 is configured to receive or transmit video information.

For the technical solution of the apparatus 1702 for obtaining motion information of video images provided in this embodiment, reference may be made to the technical solution provided in Embodiment 4 or Embodiment 8, so that the details will not be described herein again.

The electronic device according to the embodiment may be a mobile phone, a video processing device, a computer or a server.

The electronic device provided in the embodiment changes the method for determining reference blocks to improve the process of obtaining motion information of video images, thereby improving the encoding and decoding efficiency of video images.

The embodiments all take B frame encoding as an example; however, the scope of application of the embodiments is not limited to B frame encoding. For example, the method provided in Embodiment 6 is also applicable to P frame encoding, while in this case the first reference frame and the second reference frame of the current frame are respectively forward reference frame $f_{n-1}$ and forward reference frame $f_{n-2}$ of the current frame, and the predicted value of the current block needs to be obtained according to Equation (4'):

$$f_n(x,y) = \{2f_{n-1}(x+u1,y+v1)+f_{n-2}(x+u2,y+v2)\}/3 \quad (4')$$

Alternatively, more accurately, the predicted value of the current block curr_blk may be calculated according to Equation (5'):

$$f_n(x, y) = \frac{w2}{w1 + w2} f_{n-1}(x, y) + \frac{w1}{w1 + w2} f_{n-2}(x, y) \quad (5')$$

where, $w1 = \sqrt{u1^2 + v1^2}$, and $w2 = \sqrt{u2^2 + v2^2}$.

Embodiment 10

A method for obtaining motion information of video images provided in this embodiment includes the following steps.

Step 101: At an encoding end, determine each set of motion vectors pointing from at least two associated reference blocks to a current encoding block by using each candidate motion vector in a candidate motion vector set of the current encoding block, where the at least two associated reference blocks are corresponding to the current encoding block.

The candidate motion vector set is obtained by using motion information of known blocks around the current encoding block, according to a space correlation between the current encoding block and neighboring blocks of the current encoding block and a time correlation between the current encoding block and blocks at positions near reference frames. The motion information of the known blocks around the current encoding block may be motion vectors of encoded blocks or decoded blocks related in time or space to the current encoding block, or a combination of the motion vectors.

The current encoding block may be a complete macro block or a partition block of a macro block, and a complete macro block is taken as an example here.

The candidate motion vector set may include: all or a part of motion vectors MVL, MVU, MVR and MEAN (MVL, MVU, MVR) of neighboring blocks related in space to the current encoding block (Curr_blk), motion vectors (col_MV1, col_MV2, col_MV3, and col_MV4 as shown in FIG. 5) in blocks that are in the corresponding position to that of the current block and are in a forward reference frame $f_{n-1}$ $f_{n-1}$ and motion vectors (MV1, MV2, . . . , MV12 as shown in FIG. 5) of neighboring blocks of the blocks that are in the corresponding position to that of the current block and are in the forward reference frame $f_{n-1}$, and motion vectors (col_MV col_MV2', col_MV3', and col_MV4' as shown in FIG. 5) in blocks that are in the corresponding position to that of the current block and are in a backward reference frame $f_{n+1}$ and motion vectors (MV1', MV2', . . . , MV12' as shown in FIG. 5) of neighboring blocks of the blocks that are in the corresponding position to that of the current block and are in the backward reference frame $f_{n+1}$, that is, include all or a part of left, up, up-left and up-right blocks of the current encoding block, and left, up, up-left and up-right blocks of blocks that are in the corresponding position to that of the current block and are in reference frames, and the blocks that are in the corresponding position to that of the current block and are in the reference frames.

Figure 18:
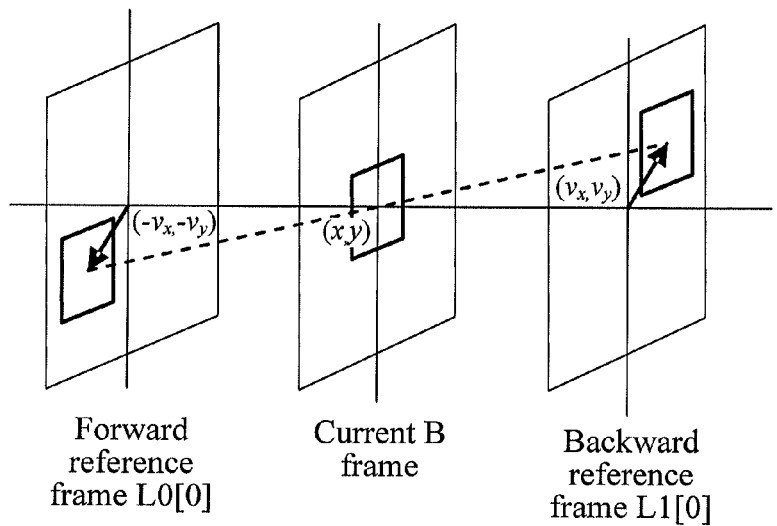
FIG. 18 is a schematic diagram of a B frame according to Embodiment 10.

For a candidate motion vector in the candidate motion vector set of the current encoding block obtained in step 101, a set of motion vectors pointing from at least two associated reference blocks of the current encoding block to the current encoding block are obtained. Each candidate motion vector is corresponding to a set of motion vectors. In this embodiment, two associated reference blocks, for example, forward and backward reference blocks of the current encoding block, are taken as an example, and each set of motion vectors are forward motion vectors of the forward reference blocks of the current block and backward motion vectors of the backward reference blocks of the current block. Specifically, for each candidate motion vector, corresponding forward and backward motion vectors are obtained. As shown in FIG. 18, taking a B frame as an example, a block in the middle is the current encoding block, L0 and L1 are forward and backward reference frames, and blocks in L0 and L1 are forward and backward reference blocks, where $V_f$ is the forward motion vector, and $V_b$ is the backward motion vector. In this example, a distance from the current B frame to the forward reference frame is $T_f$ and a distance from the current B frame to the backward reference frame is $T_b$. Each pair of forward and backward motion vectors within a search range satisfy the following relation: $V_f/T_f = -V_b/T_b$. When multiple associated reference blocks exist, the relation between motion vectors of each pair within the search range is the same as that described above. FIG. 18 only shows the case where a B frame is directly neighboring to two reference frames. For multiple continuous B frames, the manner of obtaining corresponding forward/backward motion vectors is the same as that described above, so that the details will not be described herein again.

In a specific implementation, all or a part of the motion vectors of encoded blocks/decoded blocks related to the current encoding block may be selected to form a candidate motion vector set, and then a first candidate reference block is determined in a first reference frame correspondingly according to each candidate motion vector, so as to obtain a set of first candidate reference blocks.

A motion vector of each first candidate reference block to the current encoding block is determined according to a position relation between the first candidate reference block and the current encoding block, and each second candidate reference block that is respectively corresponding to each first candidate reference block is determined in the second reference frame according to the motion vector. For example, in this embodiment, the second candidate reference block corresponding to the first candidate reference block in the second reference frame may be determined through symmetry searching, that is to say, after symmetry searching, the first candidate reference block and the found corresponding second candidate reference block are symmetrical in proportion with the current encoding block as the center.

Step 102: Determine a set of motion vectors as predicted vectors of motion vectors of the current encoding block from sets of motion vectors by similarity judgment.

A similarity between each determined set of motion vectors is calculated. The similarity may be measured by using a sum of difference. Specifically, the sum of difference may be a sum of absolute difference (SAD), a sum of absolute transformation differences, or a sum of absolute squared differences, and definitely may also be other parameters for describing a similarity between two reference blocks; in this embodiment, the sum of absolute differences is taken as an example to describe the solutions provided by embodiment. A set of motion vectors corresponding to the optimal similarity are selected as predicted vectors of motion vectors of the current encoding block.

In a specific implementation, a sum of differences between a first candidate reference block and a second candidate reference block corresponding to the first candidate reference block is calculated, the first candidate reference block and the second candidate reference block with a minimal SAD are selected as a first reference block and a second reference block of the current block, and motion vectors determined by the first reference block and the second reference block are used as predicted vectors of motion vectors of the current encoding block.

In another implementation, step 101 and step 102 may be implemented through steps 701 to 707 of Embodiment 3, and the difference lies in that the motion vectors (u, v) determined by the first reference block and the second reference block are used as predicted vectors of motion vectors of the current block.

Step 103: Obtain a motion vector difference according to motion vectors, which are obtained by motion search performed on the current encoding block, and the predicted vectors, where the motion vector difference is used by a decoding end to recover the motion vectors of the current encoding block.

To enable the decoding end to obtain more accurate motion information, in this embodiment, the encoding end may further obtain a difference between the obtained motion information and true motion information according to the obtained motion information, and send the difference of motion information to the decoding end, that is, calculate a vector difference between the predicted vectors obtained in step 102 and motion vectors that are of the current encoding block and are obtained by motion search, and send the motion vector difference to the decoding end. In this way, after receiving data provided by the encoding end, the decoding end first recovers the true motion information according to the difference of motion information.

At the decoding end, each set of motion vectors pointing from at least two associated reference blocks to the current encoding block are determined by using each candidate motion vector in a candidate motion vector set of the current encoding block, where the at least two associated reference blocks correspond to a current encoding block, the candidate motion vector set is obtained by using motion information of known blocks around the current encoding block according to a space correlation between the current encoding block and neighboring blocks of the current encoding block and a time correlation between the current encoding block and blocks at positions near reference frames; and a set of motion vectors are determined as predicted vectors of motion vectors of the current block from sets of motion vectors by using similarity judgment criteria; and the vector difference is recovered by code stream parsing, and the motion vectors of the current encoding block are obtained by using the predicted vectors and the vector difference.

In another embodiment, in step 102, a set of motion vectors may be determined as motion vectors of the current encoding block from sets of motion vectors by similarity judgment.

Persons of ordinary skill in the art may understand that information, messages, and signals may be represented by using any one of many different techniques and technologies. For example, the messages and the information in the foregoing descriptions may be represented as voltages, currents, electromagnetic waves, magnetic fields or magnetic particles, optical fields, or any combination of the voltages, currents, electromagnetic waves, magnetic fields or magnetic particles and optical fields.

Persons of ordinary skill in the art may realize that, units and algorithm steps of each example described through the embodiments disclosed herein can be implemented with electronic hardware, computer software, or a combination of the electronic hardware and computer software. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope.

The steps of the methods and algorithms described through the embodiments disclosed herein may be implemented by using hardware, a software module executed by a processor, or a combination of the hardware and software module. The software module may be built in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The foregoing descriptions are exemplary embodiments are not intended to limit the protection scope of the claims. Modifications or variations that can be figured out easily by persons skilled in the art within the technical scope of the claims shall fall within the protection scope of the claim.

What is claimed is:

1. A method for obtaining motion information of video images, comprising:
   determining, in a first reference frame, one or more first candidate reference blocks that correspond to a current block in a current frame according to known motion information related to the current block;
   determining motion vectors between the one or more first candidate reference block to the current block;
   for each of the one or more first candidate reference blocks, determining, based on a corresponding motion vector of the first candidate reference block and in a second reference frame, a second candidate reference block that is symmetrically positioned about the current block such that the current block is centered in between the first reference block and the second reference block;
   obtaining the similarity between the first candidate reference block and the second candidate reference block and similarities between templates corresponding to the candidate reference blocks and a template corresponding to the current block;
   according to the obtained similarities, selecting the first candidate reference block and the second candidate reference block that have the minimal value in the similarity; and
   determining motion information of the current block according to motion information of the selected first candidate reference block and second candidate reference block.

2. The method for obtaining motion information of video images according to claim 1, wherein the determining the motion information of the current block according to the motion information of the selected first candidate reference block and second candidate reference block comprises:
   using the motion information of the selected first candidate reference block and the second candidate reference block as the motion information of the current block; or
   obtaining a difference between the motion information of the selected first candidate reference block and second candidate reference block and true motion information of the current block, and sending the difference between motion information to a decoding end for obtaining the motion information of the current block.

3. The method for obtaining motion information of video images according to claim 1, wherein the known motion information related to the current block comprises motion information of known blocks related in time or space to the current block, or a combination of the motion information of the known blocks.

4. The method for obtaining motion information of video images according to claim 1, wherein the known blocks are encoded or decoded blocks neighboring to the current block, comprising all or a part of left, up, up-left and up-right blocks of the current block, and left, up, up-left and up-right blocks of blocks that are in the corresponding position to that of the current block and are in reference frames, and the blocks that are in the corresponding position to that of the current block and are in reference frames.

5. The method for obtaining motion information of video images according to claim 1, wherein motion information of known blocks related in time or space to the current block is used as a candidate motion vector of the first candidate reference block.

6. The method for obtaining motion information of video images according to claim 1, wherein the second candidate reference block corresponding to the first candidate reference block in the second reference frame is determined through symmetry searching, after symmetry searching, the first candidate reference block and the found corresponding second candidate reference block are symmetrical in proportion with the current block as the center.

7. A method for obtaining motion information of video images, comprising:
   determining, in a first reference frame, one or more first candidate reference blocks that correspond to a current block in a current frame according to known motion information related to the current block;
   for each of the one or more first candidate reference blocks, determining, based on the known motion information of the first candidate reference block and in a second reference frame, a second candidate reference block that is symmetrically positioned about the current block such that the current block is centered in between the first reference block and the second reference block;
   obtaining the similarity between the first candidate reference block and the second candidate reference block and similarities between templates corresponding to the candidate reference blocks and a template corresponding to the current block;
   according to the obtained similarities, selecting the first candidate reference block and the second candidate reference block that have the minimal value in the similarity; and
   determining motion information of the current block according to motion information of the selected first candidate reference block and second candidate reference block.

* * * * *